United States Patent [19]
Wozniak

[11] Patent Number: 5,506,970
[45] Date of Patent: Apr. 9, 1996

[54] BUS ARBITRATOR CIRCUIT

[75] Inventor: Yannick Wozniak, Paris, France

[73] Assignee: Bull S.A., Paris, France

[21] Appl. No.: 955,890

[22] PCT Filed: Apr. 14, 1992

[86] PCT No.: PCT/FR92/00333

§ 371 Date: Dec. 9, 1992

§ 102(e) Date: Dec. 9, 1992

[30] Foreign Application Priority Data

Apr. 15, 1991 [FR] France ................................... 92 04597

[51] Int. Cl.⁶ .................................................. G06F 13/00
[52] U.S. Cl. ............................................ 395/293; 395/729
[58] Field of Search ..................................... 395/325, 275, 395/425, 200, 725

[56] References Cited

U.S. PATENT DOCUMENTS

| | | | |
|---|---|---|---|
| 4,991,085 | 2/1991 | Pleva et al. ................................ | 395/275 |
| 5,038,320 | 8/1991 | Heath et al. ............................. | 395/275 |
| 5,083,260 | 1/1992 | Tsuchiya .................................. | 395/325 |
| 5,195,185 | 3/1993 | Marenin .................................. | 395/325 |
| 5,329,634 | 7/1994 | Thompson ................................ | 395/500 |
| 5,379,386 | 1/1995 | Swarts et al. ............................ | 395/325 |

OTHER PUBLICATIONS

"Dynamic Priority Manager Under Application Program Control", A. Couder, et al. vol. 27, No. 4A, Sep. 1984, IBM Technical Disclosure Bulletin, pp. 2216–2218.

"Serial Link Communication Module for Local Work Station Attachments" D. A. Stockwell, vol. 26, No. 6, Nov. 1983, IBM Technical Disclosure Bulletin, pp. 2817–2819.

*Primary Examiner*—Glenn A. Auve
*Attorney, Agent, or Firm*—Weingarten, Schurgin, Gagnebin & Hayes

[57] ABSTRACT

A bus arbiter circuit including a bus arbitration logic circuit, a command logic circuit coupled to the bus arbitration logic circuit, a decode circuit having a plurality of programmable option select registers wherein the decode circuit is coupled to the bus arbitration logic circuit and command logic circuit and an operating mode decode logic circuit coupled to the bus arbitration logic circuit, the command logic circuit and the decode circuit, the operating mode decode logic circuit for decoding signals provided to the bus arbiter circuit and for determining the meaning of the contents of the programmable option select registers.

18 Claims, 29 Drawing Sheets

MODE 0(ESDI)

| | 7 | 6 | 5 | 4 | 3 | 2 | 1 | 0 | |
|---|---|---|---|---|---|---|---|---|---|
| POS 2 | 0 | FE | ARB | | | | ALTIO | ENCD | ←112 ←113 |
| POS 3 | 0 | 0 | BURST | | | ENROM | SEGROM | | |
| POS 4 | A10 | A9 | A8 | A7 | A6 | A5 | A4 | X | ←114 |
| POS 5 | 1 | 1 | RDY | A15 | A14 | A13 | A12 | A11 | ←115 |

FIG.2

MODE 2 (DWA)

POS (2)

| 7 | 6 | 5 | 4 | 3 | 2 | 1 | 0 |
|---|---|---|---|---|---|---|---|
| NIT | | SEGROM | | | ENRAM | ENIO | ENCD |

←112

POS (3)

| 7 | 6 | 5 | 4 | 3 | 2 | 1 | 0 |
|---|---|---|---|---|---|---|---|
| W SIZE | | A19 / A23 | A18 / A22 | A17 / A21 | A16 / A20 | A15 / A19 | A14 / A18 |

←113
RAM MEMORY FIELD ADDRESS

POS (4)

| 7 | 6 | 5 | 4 | 3 | 2 | 1 | 0 |
|---|---|---|---|---|---|---|---|
| A10 | A9 | A8 | A7 | A6 | A5 | VROM | M1,16 |

←114
FIELD ADDRESS 10 OF MODULO 32 COUPLER

POS (5)

| 7 | 6 | 5 | 4 | 3 | 2 | 1 | 0 |
|---|---|---|---|---|---|---|---|
| CCK | STAT | RDY | A15 | A14 | A13 | A12 | A11 |

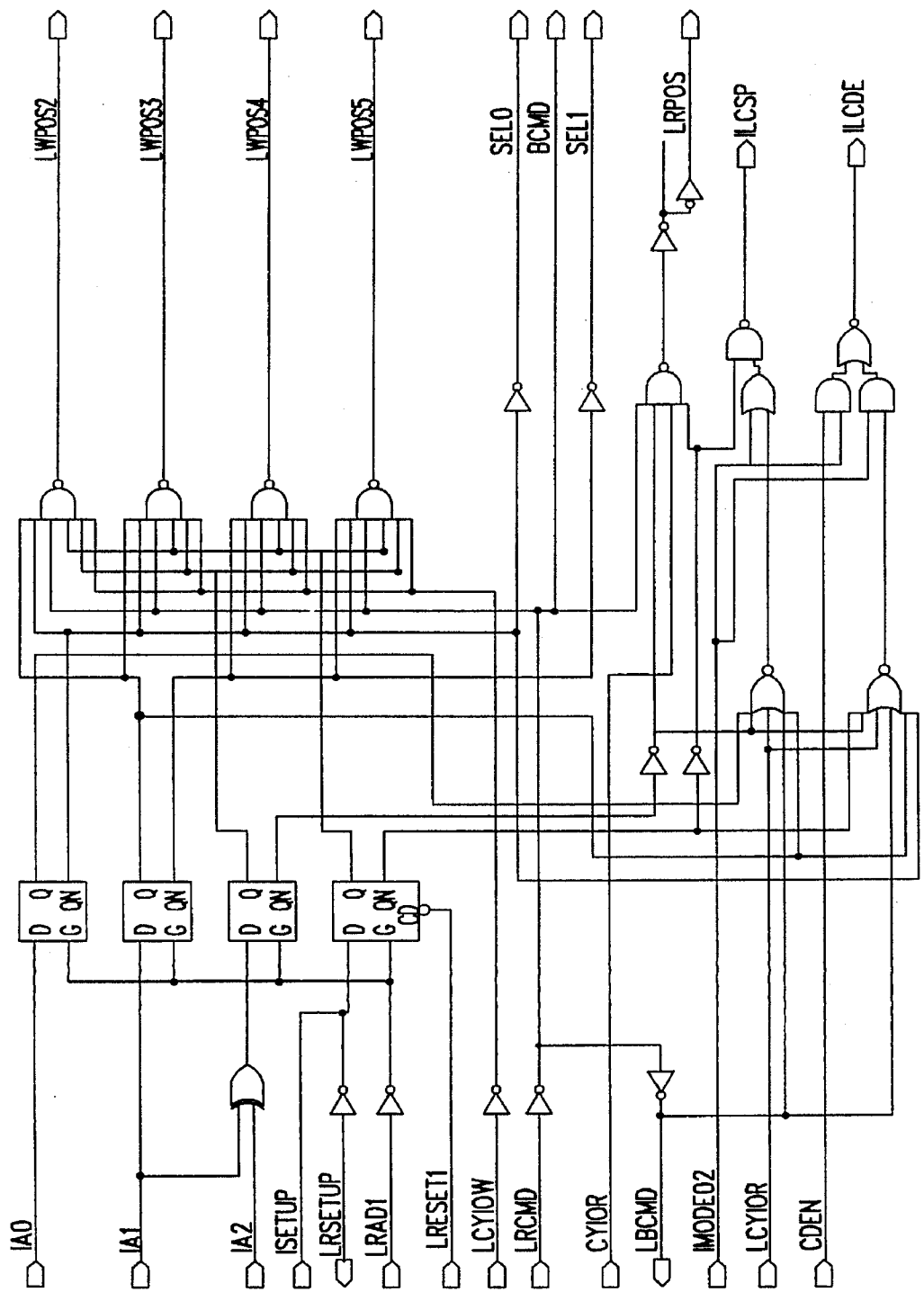

BUS ARBITRATOR CIRCUIT

FIELD OF THE INVENTION

The present invention relates to an MCA bus arbitrator integrated circuit that provides an interface between an MCA bus and the logic circuits of a card on which various functions have been incremented.

BACKGROUND OF THE INVENTION

As is known in the art microchannel bus arbiter circuits are used to connect a peripheral device to a microchannel bus. The arbiter circuit typically includes a bus arbitration logic circuit, a command logic circuit, a decode circuit, and a plurality of programmable option select (POS) registers. The arbiter circuits further include multi functions pins and a plurality of comparators coupled to selected ones of the POS registers and coupled to selected groups of pins of the multi functions pins. The multifunction pins may be provided as read and write signal entry pins and are used to decide whether or not the POS registers can be used internally or externally on these multi-function pins.

It would be desirable, however, to provide output pins for each of the arbitration logic, command logic, and decode circuits the meaning of which could be changed according to the content of the POS registers and the selected mode for enabling, for example, several kinds of memory, such as Random Access Memory (RAM) and Read Only Memory (ROM).

SUMMARY OF THE INVENTION

The present invention relates to an MCA bus arbitrator integrated circuit that provides an interface between an MCA bus and the logic circuits of a card on which various functions have been incremented.

Hence a first goal of the invention is to provide a bus arbitrator integrated circuit allowing various operating modes of this integrated circuit to be implemented.

This goal is achieved by the fact that the integrated circuit comprises a bus arbitration logic, a command logic, a decode circuit, a set of registers, and a logic circuit decoding the signals received to determine one operating mode out of four to control operation, depending on the mode selected, of various circuits and setting up the content of the registers in the set according to a given meaning.

According to another characteristic, of the four registers two are assigned to define the input/output field address of the MODULO 8 coupler in modes 0, 1, and 3 and MODULO 16 in mode 2.

According to another characteristic, a third register of the four, in the case of mode 0, 1, and 3, defines the size of the extension segment of the basic input/output system, and the read only memory (ROM) segment number of the basic input/output system;

the size of the coupler input/output field on two bits by masking bits A3 and A4 of the address, and one bit for enabling the card;

and in the case of mode 2, selection of one interrupt out of four;

segment number of read only memory ROM BIOS;

enable random access memory RAM;

enable inputs/outputs;

card enable

According to another feature, a fourth register is assigned to define in mode 0:

size of direct memory access (DMA) mode bursts;

local arbitration enable;

activation of fairness mode;

priority level of direct memory access (DMA) mode.

According to another feature, this fourth register is assigned to define in mode 2:

size of memory window;

address in ten memory field bits.

According to another feature, this same register in mode 1 is assigned to define the size of the random access memory (RAM) window:

RAM segment number in window mode;

selection of one interrupt out of four.

This same register is assigned in mode 3 to define a first priority level of the direct memory access (DMA) mode;

a second priority level of the direct memory access (DMA) mode.

According to another characteristic, the arbitration logic, in mode 0 and 3, delivers the bus channel setup request signal LPREEMPT by an arbitration procedure, whereby the ARBGNT signal indicates that an arbitration procedure is under way, the DRQ0 signal indicates a DMA channel request presented by a circuit of the card on the arbitration circuit, the ARB0-3 signals define bus arbitration priority levels, and the DACK0 signal indicates to the card circuit a direct memory access cycle following a request made by the DRQ0 signal.

According to another characteristic, the programmable option selection (POS) register decode circuit, in mode 0 and 3 delivers the LCDEN signals that enable a card on which the circuit is located and the POS register selection signals LCSPOS.

According to another characteristic, in mode 1 and 2 the arbitration logic supplies interrupt level determination signals IT (0–3), memory read command signal LMEMRD, memory write command signal LMEMWR, and random access memory (RAM) selection signal LCSRAM.

The programmable option selection (POS) register decode circuits, in mode 1 and 3, deliver the 0EID0 and 0EID1 signals enabling registers containing the identifier of a card on which the circuit is located.

According to another characteristic, in mode 2 the arbitration logic furnishes CHCK signal indicating at the output that a serious error has appeared, ICHCK signal indicating at the input that a serious error has appeared, INT signals indicating that an interrupt has appeared, WS (0–1) signals indicating the size of the Ram used in association with the arbitration circuit on a card, and STAT signal indicating the presence of an error status.

According to another characteristic, the arbitration logic, in mode 0, delivers interrupt signals TC of a DMA BURST exchange.

According to another characteristic, in mode 3 the arbitration logic delivers signals DRQ1 indicating a DMA channel request presented by the circuit on the arbitration circuit card, whereby DACK1 indicates to the card circuit a direct memory access cycle following a request made by the DRQ1 signal.

Another goal of the invention is to propose the use of this arbitration integrated circuit in various applications.

According to this other goal, this circuit is used in a LAN card having a circuit connected for the control signals with the arbitration circuit by a 15-line address bus and buffer registers commanded by the LADL signal of the arbitration circuit on the 24-line bus by an 8-bit data bus connected by a buffer register commanded by the DIR, LDEN signals to the 8-bit data bus of the MCA bus, and an EPROM memory selected by the LCSROM signal.

According to another application, this circuit is used in a minimum LAN card having a circuit connected for the control signals with the arbitration circuit, by a 15-line address bus and buffer registers commanded by the LADL signal of the arbitration circuit on the 24-line bus by an 8-bit data bus connected by a buffer register commanded by the DIR, LDEN signals to the 8-bit data bus of the MCA bus, and an EPROM memory selected by the LSCROM signal.

According to another goal, this circuit is used in an ESDI card.

BRIEF DESCRIPTION OF THE DRAWINGS

Other characteristics and advantages of the present invention will appear more clearly from reading the description hereinbelow with reference to the attached drawings wherein:

FIGS. 2 to 5 represent the information contained in the programmable option selection (POS) registers according to the operating mode of the circuit;

FIGS. 6B to 6G are diagrams showing the decode logic of FIG. 6A;

DETAILED DESCRIPTION

Figure 1:
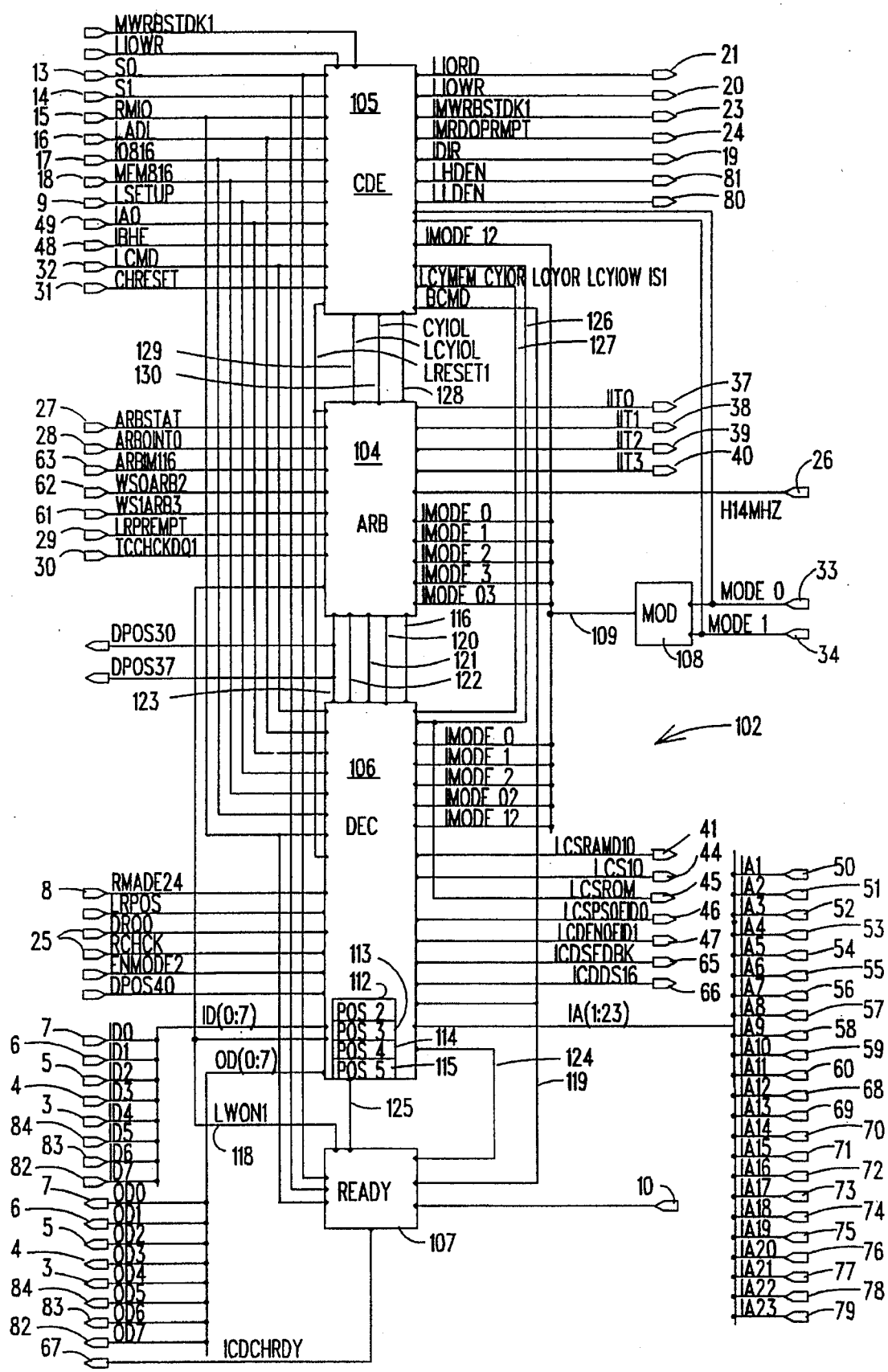
FIG. 1 is the functional diagram of the integrated circuit.
Figure 3:
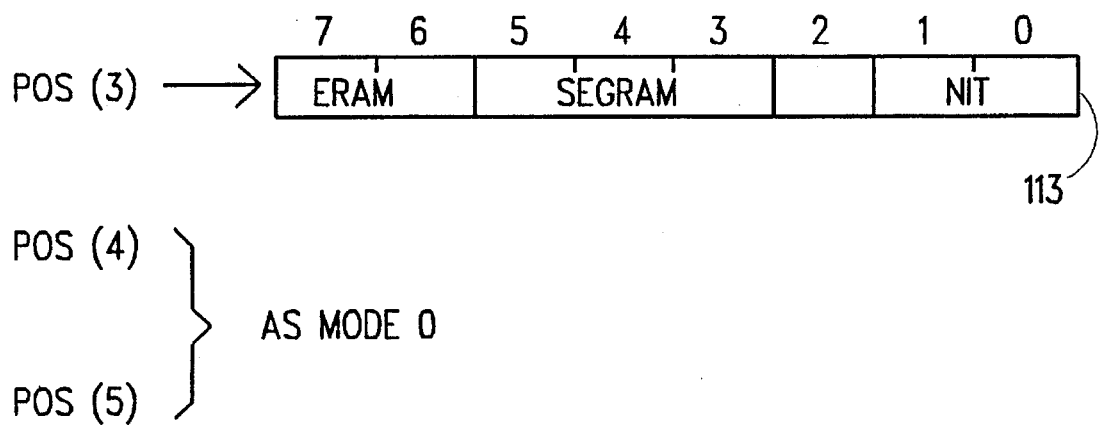

The arbitration circuit of the MCA bus in FIG. 1 has an operating mode decode logic (108) which, through the MODE0 (33) and MODE1 (34) pins receives the signals that will allow one operating mode to be selected from the four possible modes of the circuit. A stack of four registers POS2 (112), POS3 (113), POS4 (114), POS5 (115), contained in a programmable option circuit POS (106) allows the other elements of the integrated circuit, as a function of the operating mode selected, to use certain information from these POS registers to modify as a consequence the signals transmitted by the different elements of this integrated circuit. These POS registers are loaded by data bus (DO, D7) connected to pins (3 to 7 and 82 to 84) of circuit (102), after transmission of the channel reset signal (CHRESET) arriving at the MCA bus on pin (31).

The operation of the arbitration circuit depends both on the decoding of the MODE0 (33) and MODE1 (34) inputs and the content of the programmable option selection registers depending on the associated mode. Thus, as shown in FIG. 2, when pins (33, 34) are connected so as to indicate the programming in mode0 to the circuit, registers (112) to (115) have the contents shown in Figure 2, with the following meanings:

Field (ENCD) of bit 0 of register (112) is the card enable field according to the following code:

"1"=card enable

"0"=card disable

The field (ALTI0) represented by bit 1 of register (112) defines an alternate address for the input-output (IO) field of the arbitration circuit and is equivalent to the presence or absence of address bit A3 which may have been placed in bit 0 of register (114), not used.

Field ARB, composed of bits 2 to 5 of register (112) defines the priority level. Bit 0 is the least significant bit associated with the lowest priority level and bit 3 is the most significant bit associated with the highest priority level.

Field FE, composed of bit 6 of register (112), defines the enable of the fairness mode according to the following code:

0=active fairness mode

1=inactive fairness mode

Bit 7 of register POS 112 is not used and is still at the low read level.

The SEGROM field composed of bits 0 to 2 of register (113) defines the segment of read only memory ROM used with the arbitration circuit according to the following table for the sizes of each 16 kB segment:

| Bit5 | Bit4 | Bit3 | |
|---|---|---|---|
| 0 | 0 | 0 | C0000–C3FFF |
| 0 | 0 | 1 | C4000–C7FFF |
| 0 | 1 | 0 | C8000–CBFFF |
| 0 | 1 | 1 | CC000–CFFFF |
| 1 | 0 | 0 | D0000–D3FFF |
| 1 | 0 | 1 | D4000–D7FFF |
| 1 | 1 | 0 | D8000–DBFFF |
| 1 | 1 | 1 | DC000–DFFFF |

The ENROM field, composed of bit 3 of register (113), enables read only memory ROM used with the arbitration circuit according to the following table:

| Bit6 | |
|---|---|
| 0 | ROM enabled |
| 1 | ROM disabled |

The BURST field, composed of bits 4–5 of register (113), defines the size of the data BURSTS exchanged in the DMA mode according to the following table:

| Bit5 | Bit4 | |
|---|---|---|
| 0 | 0 | single access |
| 0 | 1 | 8 cycles |
| 1 | 0 | 16 cycles |
| 1 | 1 | 32 cycles |

Bits 6 and 7 of register POS 113 are not used and are still at the low read level.

Bits 1 to 7 of register (114) define input-output (IO) field position address bits A4–A10 in the input-output (IO) space of the system, and bits 0 to 4 of register (115) define the input-output field position address bits A11–A15 in the input-output space of the system.

The RDY field, composed of bit 5 of register (115), defines the management type of channel ready signal CDCHRDY according to the following code:

0=200 ns cycle

1=300 ns or>300 ns cycle

It will be noted that ROM access is not sensitive to this bit and is fixed at 300 ns.

Bits 6 and 7 of register (115) are not used and are still at the high read level.

As concerns mode 1, registers (112, 114, and 115) are defined as for mode0; only register (113) is modified and the NIT field composed of bits 0 and 1 of this register defines the interrupt line number of the MCA bus used according to the following table:

| Bit0 | Bit1 | |
|---|---|---|
| 0 | 0 | IT0 |
| 0 | 1 | IT1 |
| 1 | 0 | IT2 |
| 1 | 1 | IT3 |

The SEGRAM field, composed of bits 3 and 5 of register (113), defines the segment of random access memory RAM used by the arbitration circuit according to the following table for RAM segment sizes of 16 kB:

| Bit5 | Bit4 | Bit3 | |
|---|---|---|---|
| 0 | 0 | 0 | C0000–C3FFF |
| 0 | 0 | 1 | C4000–C7FFF |
| 0 | 1 | 0 | C8000–CBFFF |
| 0 | 1 | 1 | CC000–CFFFF |
| 1 | 0 | 0 | D0000–D3FFF |
| 1 | 0 | 1 | D4000–D7FFF |
| 1 | 1 | 0 | D8000–DBFFF |
| 1 | 1 | 1 | DC000–DFFFF |

The field (ERAM), composed of bits 6 and 7 of register (113), defines the size of the Ram associated with the arbitration circuit according to the following table:

| Bit7 | Bit6 | |
|---|---|---|
| 0 | 0 | no RAM |
| 0 | 1 | 16 kB |
| 1 | 0 | 32 kB |
| 1 | 1 | 64 kB |

In mode 2, field (ENCD), composed of bit 0 of register (112), and the SEGROM field composed of bits 3 and 5 from this same register, have the same meanings as for mode 0.

Field (ENIO), composed of bit 1 of register (112), is the input-output enable (IO enable) field according to the following code:

1=input-output enabled

0=input-output disabled.

Field (ENRAM), composed of bit 2 of register (112), is the RAM memory enable field according to the following code:

1=RAM memory enabled

0=memory disabled

The field (NIT), composed of bits 6 and 7 of register (112), defines the interrupt line number used according to the following table:

| Bit7 | Bit6 | |
|---|---|---|
| 0 | 0 | IT0 |
| 0 | 1 | IT1 |
| 1 | 0 | IT2 |
| 1 | 1 | IT3 |

Bits 0 to 5 of register (113) define the position of the RAM memory field as a function of the field value (Ml16) constituted by bit 0 of register (114) according to the following table:

If Ml16=0, the RAM field is defined by address bits A14–A19 of the address bus;

If Ml16=1, the RAM field is defined by address bits A18–A23 of the address bus;

The field (WSIZE), composed of bits 6 and 7 of register (113), defines the size of the RAM memory field as a function of the field value Ml16 according to the following table:

| Bit7 | Bit6 | |
|---|---|---|
| . If M116 = 0 | | |
| 0 | 0 | X |
| 0 | 1 | 16 kB |
| 1 | 0 | 32 kB |
| 1 | 1 | 64 kB |
| . If M116 = 1 | | |
| 0 | 0 | X |
| 0 | 1 | 256 kB |
| 1 | 0 | 512 kB |
| 1 | 1 | 1 MB |

Field (Ml16), composed of bit 0 of register (114), defines the RAM memory field position relative to the first megabyte according to the following table:

M116 =0 in first MB

M116 =1 above the first MB within the limit of 16 MB.

The field (VROM), composed of bit 1 of register (114), defines the ROM memory enable according to the following code:

0=memory disable =16 kB memory enabled

Bits 2 to 7 of register (114) define, by address lines A5–A10 of the MCA bus, the input-output field position in the input-output space of the system.

Bits 0 to 3 of register (115) define, by address lines A11–A14 of the MCA bus, the input-output field position in the input-output space of the system.

The field (RDY) has the same definition as in mode0.

The field (STAT), composed of bit 6 of register (115), defines the status availability according to the following code:

0=status present

1=no status

The field (CCK), composed of bit 7 of register (115), defines the channel check indicator according to the following code:

0=check indicator present

1=no check indicator

Figure 4:
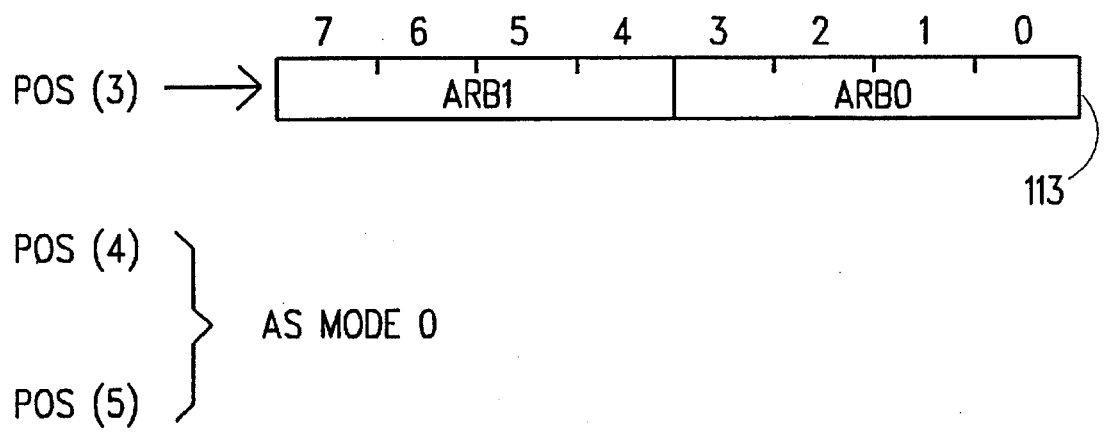

Finally, regarding mode3, as shown in FIG. 4, registers (112, 114, 115) are identical to those of mode0, register (113) only is modified, and field (ARB0), composed of bits 0 to 3 from this register (113), defines the priority level among the four possible levels of channel 0, bit 0 being the least significant and bit 3 the most significant.

Field (ARB1), composed of bits 4 to 7, defines the priority level of DMA channel 1, bit 4 being the least significant and bit 7 the most significant.

A circuit (106), on reception of the setup signal from the POS registers (LS and UP) received at pin (9) and a selection signal sent to the address bus, allows signals (LCPSOEID0) and (LCDENOEID1) signals to be sent to the respective pins (46, 47). The letter "L" placed in front of the name of the signal (for example LSETUP) indicates that the setup signal is active in the low status.

In modes 0 and 2, output (46) is composed of the (LCSPOS) signal which, when the local output is active at the low status, indicates selection of POS registers (110) to (117), with signal (LSETUP) being locked by signal (LADL).

Output (47) is composed of enable signal (LCDEN) of the card on which the arbitration circuit is installed.

In modes 1 and 3, output (46) is composed of signal (0EID0) indicating validation (enable) at the output from identifier (ID0). This active output at the low state indicates reading of a register (110) containing identifier (ID0).

The output (47) is composed of signal (0EID1) indicating output validation (enable) of identifier (ID1).

Decode circuit (106) also delivers signal (CDDS16) to pin (16); signal (CDSFDBK) to pin (65); signal (CSROM) to pin (45); signal (LCSI0) to pin (44); signal (SCRAM DKO) to pin (25).

This decode circuit (106) receives signal (LADL) at pin (16); signal (MIO) at pin (15); the 24 address bits (A0–A23) at pins (49 to 60) and (68 to 79); signal (MADE24) at pin (8); signal (BHE) at pin (48).

This circuit also receives signal (MEM816) at pin (18); and signal (I0816) at pin (17).

The meaning and action of the various signals are listed below in the text and it will be seen below that certain pins such as (46, 47) for example transmit or receive signals (LCSP, OEID0) that have different meanings according to the operating mode selected by pins (33, 34).

Circuit (107) that produces the "ready" signal delivers signal (IRDY) internally to the card via the arbitrator at pin (10) and delivers signal (CDCHRDY) externally to the bus MCA at pin (67).

This signal (107) receives, via link (118), the signal (LWON1) produced by arbitration circuit (104). This signal (LWON1) is also sent to decode circuit (106).

Circuit (107) also receives via line (124) the signals (LADROM, LADI0, LADRAM, CSRAM, CSI0) coming from circuit (106) and via link (119) signal (BCMD) coming from circuit (106). This signal (BCMD) is also sent via link (119) to circuit (105). Finally, circuit (107) receives, via link (125), signal (DPOS55) which is composed of the fifth bit of register POS5 (115).

Control circuit (105) receives in input signal (LCMD) at pin (32); it receives signal (S0) at pin (13); and signal (S1) at pin (14); and at the output transmits signal (LIORD) at pin (21); transmits signal (LIOWR) at pin (20); transmits signal (LLDEN) at pin (80); signal (LHDEN) at pin (19); and signal (DIR) at pin (81).

This circuit (105) also, at the output, transmits signal (LMWRBSTDK1) at pin (23) and signal (LMRDOPREMPT) at pin (24).

A bus arbitration circuit (104) receives in input signal (ARBOINT0) at pin (28); it receives signal (LPREMPT) at pin (29); and the 14 MHz clock at pin (26).

This arbitration circuit (104) transmits in input or output, signal (ARBSTAT) to pin (27); signal (TCCHCKDQ1) to pin (30); signal (WSOARB2) to pin (62); signal (WS1APB3) to pin (61); and signal (ARB1M116) to pin (63).

Finally, in output, arbitration circuit (104) transmits one of the four interrupts IT (0 to 3) available at pins (37) to (40). This circuit (103) also receives, via line (109), bits 6 and 7 (NIT) of register POS (112) in Mode2. Pins (37 to 40) also constitute outputs (0ARB0to3) of bus arbitration circuit (104).

A communications bus (109), via mode circuit (108), furnishes to all the decode (106), command (105), and arbitration (104) circuits, the mode signals that allow these circuits (106, 105, 104, 107) to select, as a function of the mode selected, the information from the POS registers useful for producing output signals on each circuit (107, 106, 105, 104) corresponding to the operating mode selected and the programming of the POS registers.

Decode circuit (106), via link (123), furnishes bits 2 to 7 of register POS2 (112) constituted by signals (DPOS 22: 27) and bits (0 to 7) of register POS3 (113).

Decode circuit (106), via link (122), delivers signal (CDEN), via link (121) delivers signal (IDRQ0), and via link (116) delivers signal (LBCMD) to arbitration circuit (104).

Arbitration circuit (104), via link (120), transmits to decode circuit (106) the signals (DACK0, STAT, ICHCK), and via link (128) to control circuit (105) transmits signals (DACK1, BURST LOPRMPT).

Arbitration circuit (104) receives from control circuit (105), via link (129), signal (LCYIOL) and via link (130), signal (CYIOL). The control circuit delivers, by link (127), signals LCYMEM, CYIOR, LCYIOR, LCYIOW, IS1), by link (126), signals (ILCSIO, ILCSRAM, ILCSROM) to decode circuit (106), and via link (103), signal (LRESET1) to arbitration circuit (104) and decode circuit (106).

The meaning of the signals transmitted or received by the various circuits in the integrated circuit is given below:

| Pin Number | Type | Symbol | Description |
| --- | --- | --- | --- |
| 3–7 | Bidir. | D4–D0 D7–D5 | Data bus. These bits are used to write or read the POS registers (112 to 115) during the circuit setup cycles. They are bidirectional three-status lines. |
| 8 | Input | MADE24 | Extended address indicator. A high level indicates an address less than or equal to 16M. |
| 9 | Input | LSETUP | This line, active at low status, |

| Pin Number | Type | Symbol | Description |
|---|---|---|---|
| | | | indicates selection of the connector for access to the POS registers connected to the connector. |
| 10 | Input | RDY | Local bus "ready" signal for asynchronous extension of the MCA cycle. The unready status is the low status. This signal must be generated such that the MCA bus signal CDHRDY does not exceed 3 µs. |
| 11–12 | | NC | Not connected. |
| 13–14 | Input | S0 S1 | MCA bus status bit. These lines indicate the start of a cycle and its type (read with S1 at low level and S0 at high level, write with S0 at low level and S0 at high level or reserved with S0 and S1 at the same levels). |
| 15 | Input | MIO | Memory/input-output cycle. This signal makes a distinction between a memory cycle and an input-output (IO) cycle. The type of cycle, write or read, is defined as a function of the values of S0 and S1. Thus, if M/IO and S1 are at the high level and S0 at the low level, a write memory cycle is run. High level: memory cycle Low level: IO cycle |
| 16 | Input | LADL | Address decode latch (or "lock"). This signal allows an address or status decode to be locked to its rising front to ensure proper running of the cycle. |
| 17 | Input | IO816 | 8 or 16 bit input-output (IO). This input determines the given bus width of the input-outputs (IO) which allow or disallow generation of signals CDDS16 and LHDEN for the input-output cycles. This line is hardwired and not a dynamic input. High level: 8 bits Low level: 16 bits |
| 18 | Input | MEM816 | 8 or 16 bit memory. This input determines the memory data bus width allowing or disallowing generation of signals CDDS16 and LHDEN for the memory cycles. This line is hardwired and is not a dynamic input. High level: 8 bits Low level: 16 bits |
| 19 | Output | LHDEN | High byte data enable. This low level active output must be connected to the input of an external enable circuit (245). This line is active with input-output (IO) access, memory [access], or in the DMA mode on 16 bits corresponding to the address fields programmed in the POS registers (112 to 115). |
| 20 | Output | LIOWR | IO write strobe. This signal, active in the low status, indicates an IO write. Decoding of the S0 S1 status and of MIO is authorized by command signal LCMD. |
| 21 | Output | LIORD | IO read strobe. This signal, active at low status, indicates an IO read. Decoding of the S0 S1 status and of MIO is authorized by command signal LCMD. |
| 22 | Output | LMWBSTDKL | Mode0: BURST. This high active signal connected to the MCA bus through an open collector inverter gate (F38) indicates transfer of a data block. This line is active after a won arbitration phase, |

| Pin Number | Type | Symbol | Description |
|---|---|---|---|
| | | | following a DRQ request if the location corresponding to bits 6 and 7 of register POS (113) is not at zero. Mode1 Mode2: LMEMWR, memory write strobe. This signal, active at the low status, indicates memory write. Decoding of statuses S0, status S1, and of MIO authorized by command signal LCMD. Mode3: LDACK1, acknowledge channel 1. This signal, active at low status, indicates an input-output (IO) cycle in DMA mode after an arbitration phase won after a DRQ1 request. |
| 24 | Output | LMRDOPREMPT | Mode0 Mode3: OPREMPT, request to MCA. This high active signal connected to the MCA bus through an open collector inverter gate (F38) indicates request of the MCA bus following a request DRQ. This line becomes inactive after a won arbitration phase. Mode1 Mode2: LMEMRD, memory read strobe. This signal, active at low status, indicates a memory read. Decoding of statuses S0, S1, and MIO is authorized by command signal LCMD. |
| 25 | Input | CHCKDRQ0 | Mode0 Mode3: DRQ0, DMA request in mode0. This input, active at high status, indicates a DMA channel request and triggers an MCA bus preempt. |
| | Output | CHCKDRQ0 | Mode2: CHCK, channel check. This output, active at high status, connected to the MCA bus through an open collector inverter, indicates appearance of a serious error that could disrupt system operation. This line becomes inactive after writing to 1 of bit 7 [of] POS 115. Mode1: not used. |
| 26 | Input | 014MHZ | Clock at 14.318 MHz. This clock is used for internal arbitration of requests DRQ0 and DRQ1 in modes. |
| 27 | Input | ARBSTAT | Mode0 Mode3: Arbitration, ARB/GNT. This high level input indicates an arbitration phase during which the competing priority levels are presented on the MCA bus (ARB0-3). At the time of the descending front of this signal, the MCA bus is allocated to the highest priority that maintains its ARB level, as long as this signal is at the low level; the other competitors have withdrawn their levels. Mode2: STAT, status. This local input reports the presence of an error status. This signal, active in the high status, activates bit 6 of POS 115 if an error is reported by the (CHCK) signal. Mode1: not used. |
| 28 | Input | ARB0INTO | Mode0 Mode3: ARB0, arbitration number. This signal from the MCA bus indicates the priority number and allows determination during the arbitration phase (with ARB1-3) of the winner. The ARB0 signal is the least significant bit. Mode1 Mode2: INTO interrupt. This local signal active at the high status indicates appearance of an interrupt. |

| Pin Number | Type | Symbol | Description |
|---|---|---|---|
| 29 | Input | LPREMPT | Mode0 Mode3: PREMPT, MCA bus request. This MCA bus signal active at the low status indicates an MCA bus request.<br>Mode1 Mode2: not used. |
| 30 | Input | TCCHCKDQ1 | Mode0: TC (Terminal Count). This MCA bus signal, active at the low status, indicates the end of a DMA mode exchange. This input is used to interrupt the BURST signal.<br>Mode1: not used.<br>Mode2: ICHCK, error check. This local signal, active at low status, indicates appearance of a serious error. This input is used to generate the CHCK signal as well as bit 7 of POS 105.<br>Mode3: DRQ1, DNA request on channel 1. This local input, active at high status, indicates request for a DMA channel and triggers a preempt of the MCA bus. |
| 31 | Input | CHRESET | Channel reset. This MCA bus signal, active at high status, is used when powering on to set up the circuit. |
| 32 | Input | LCMD | Command. This signal from the MCA bus is active at low status. This input indicates that the data are valid on the bus. Its rising front indicates end of cycle. This signal is used to authorize input-output (IO) and memory commands as well as data buffer commands. |
| 33–34 | Input | MODE0<br>MODE1 | These local signals indicate the operating mode of the circuit.<br><br>| Mode0 | Mode1 | |<br>|---|---|---|<br>| 0 | 0 | Mode0 |<br>| 1 | 0 | Mode1 |<br>| 0 | 1 | Mode2 |<br>| 1 | 1 | Mode3 | |
| 35 | Input | TESTIN | Circuit test input signal. This input must be at the low level in operation. |
| 36 | Output | TESTOUT | Circuit test output signal. |
| 37–40 | Output | OARB0IT0<br>OARB1IT1<br>OARB2IT2<br>OARB3IT3 | Mode0 Mode3: OARB (0–3), arbitration number. Bus arbitration priority level. These 4 bits are connected to MCA bus ARB through open inverter collectors (F38) and are active at the time of an arbitration phase following an MCA bus request. These signals are maintained when an arbitration is won and disappear if it is lost.<br>Mode1 Mode2: IT (0–3) interrupt number. Interrupt lines. These 4 outputs are connected to MCA bus IRQ through open inverter collectors (F38).<br>The INT input is transmitted to multiplexer (103) which sends it to one of the 4 IT outputs (0–3) according to the configuration of bits 6 and 7 (NIT) of POS register (112) in Mode2. These lines are active at the high level. |
| 41 | Output | LCSRAMDK0 | Mode0 Mode3: LDACK0, acknowledge channel 0. This local output, active at low status, indicates an input-output (IO) cycle in the DMA mode after an arbitration phase won following a DRQ0 request in Mode3. This local output, active at low status, indicates arbitration won following a DRQ0 request in Mode1. |

| Pin Number | Type | Symbol | Description |
|---|---|---|---|
| | | | This line becomes inactive at the next arbitration.<br>Mode1 Mode2: LCSRAM, chip select RAM. This local output active at low status indicates selection of the RAM field programmed in bits 2 of register POS 112 and 0 of register 114 for modes 1 and 2 and (on the one hand) register 113 in mode 2 or (on the other hand) bits 3 to 7 of register 113 in mode 1. Addresses and valid statuses are locked by LCMD. |
| 44 | Output | LCSIO | Chip select Input-Outputs. This local output, active at low status, indicates selection of the input-output (IO) field programmed in the POS registers, on the one hand whose size in modes 0, 1, and 3 is indicated by bits 1, 2 (IOA) of register 112 and whose position is indicated by register 114 and bits 0–4 of register 115, and on the other hand is validated (enabled) in mode 2 by bit 1 of register 112, and whose position is indicated by bits 0–4 of register 115 and 2–7 of register 114. |
| 45 | Output | LCSROM | Chip select ROM. This local output, active at low status, indicates selection of the ROM field programmed in fields (SEG ROM) of bits (3–5) of register 112 and bits 6–7 (EROM) of register 112 in modes 0, 1, and 3 or of bit 1 (VROM) of register 114 in mode 2. Valid addresses and status reads are locked by LCMD. |
| 46 | Output | LCSPOEID0 | Mode0 Mode2: LCSPOS - POS register selection. This local output, active at low status, indicates selection of POS registers 110 to 117. The LSETUP signal is locked by LADL.<br>Mode1 Mode3: OEID0, identifier output enable (output enable ID0). This local output active at low status indicates reading of register POS 110. |
| 47 | Output | LCDENOEID1 | Mode0 Mode2: LCDEN card enable. This local output active at low status indicates that the card is active (bit 0 POS 112).<br>Mode1 Mode3: OEID1, identifier ID1 output enable (output enable ID1). This local output active at low status indicates reading of register POS 111. |
| 48 | Input | BHE | System byte high enable. This signal from the MCA bus is used to validate the high byte when accessing a 16-bit system. |
| 49–60<br>68–79 | Input | A0–A11<br>A12–A23 | MCA bus addresses. These bits, of which A0 is the least significant bit and A23 the most significant, are used to decode the memory and input-output (IO) resources. |
| 61 | Input | WS1ARB3 | Mode0 Mode3: ARB3, arbitration level. This MCA bus signal indicates the priority level and enables the winner to be determined during the arbitration phase (with ARB0–ARB2). ARB3 is the most significant bit. |
| | Output | WS1ARB3 | Mode2: WS1, size of memory window. This local output indicates with |

-continued

| Pin Number | Type | Symbol | Description |
|---|---|---|---|
| | | | bits WS0 and M116 the size of the memory used by the card. This size is defined in mode 2 by bits 6, 7 (WSIZE) of register 113 and bit 0 (M116) of register 114. M116 = 0: in first megabyte<br><br>WS0　WS1　Size<br><br>　1　　1　　64 kB<br>　0　　1　　32 kB<br>　1　　0　　16 kB<br>M116 = 1: over 1 megabyte<br>WS0　WS1　Size<br><br>　1　　1　　1 MB<br>　0　　1　　512 MB<br>　1　　0　　256 MB |
| 62 | Input | WS0ARB2 | Mode0 Mode3: ARB2, arbitration level. This signal from the MCA bus indicates the priority level and enables the winner to be determined during the arbitration phase (with ARB0-1-3). |
| | Output | WS0ARB2 | Mode2: WS0, memory window size. This local output indicates, with bits WS1 and M116, the size of the memory used by the card. See table WS1 ARB3. |
| 63 | Input | ARB1M116 | Mode0 Mode1 Mode3: ARB1, arbitration level. This signal from the MCA bus indicates the priority level and allows the winner to be determined during the arbitration phase (with ARB0-2-3). |
| | Output | ARB1M116 | Mode2: M116. This local output indicates, as seen above, the position of the memory used in the memory space of the system. See TABLE WS1 ARB3. |
| 65 | Output | CDSFDBK | Card selected feedback. This output active at high status connected to the MCA bus through an inverter (F04) indicates selection of a memory or input-output (IO) zone used by the card. |
| 66 | Output | CDDS16 | Card data size 16. This output active at high status connected to the MCA bus through an inverter (F04) indicates selection of a memory or input-output (IO) zone of 16 bits. |
| 67 | Output | CDCHRDY | Channel ready. This output, connected to the MCA bus through an inverter (F04), indicates an unready state at high status. This line can be generated by programming bit 5 of POS register 115 and maintained by the RDY input. |
| 80 | Output | LLDEN | Low byte data enable. This local output, active at the low level, indicates low access of a local input-output (IO) or memory resource. This line must be connected to the enable chip of an external buffer (245). |
| 81 | Output | DIR | Direction. This local output indicates the direction of data transfers currently under way. A low level indicates a read and a high level, a write. This line must be connected to the direction [sic] of an external buffer (245). |
| 1　43 | Input | VDD | 5V |
| 2　22<br>42　64 | Input | VSS | Ground |

Figure 6A:
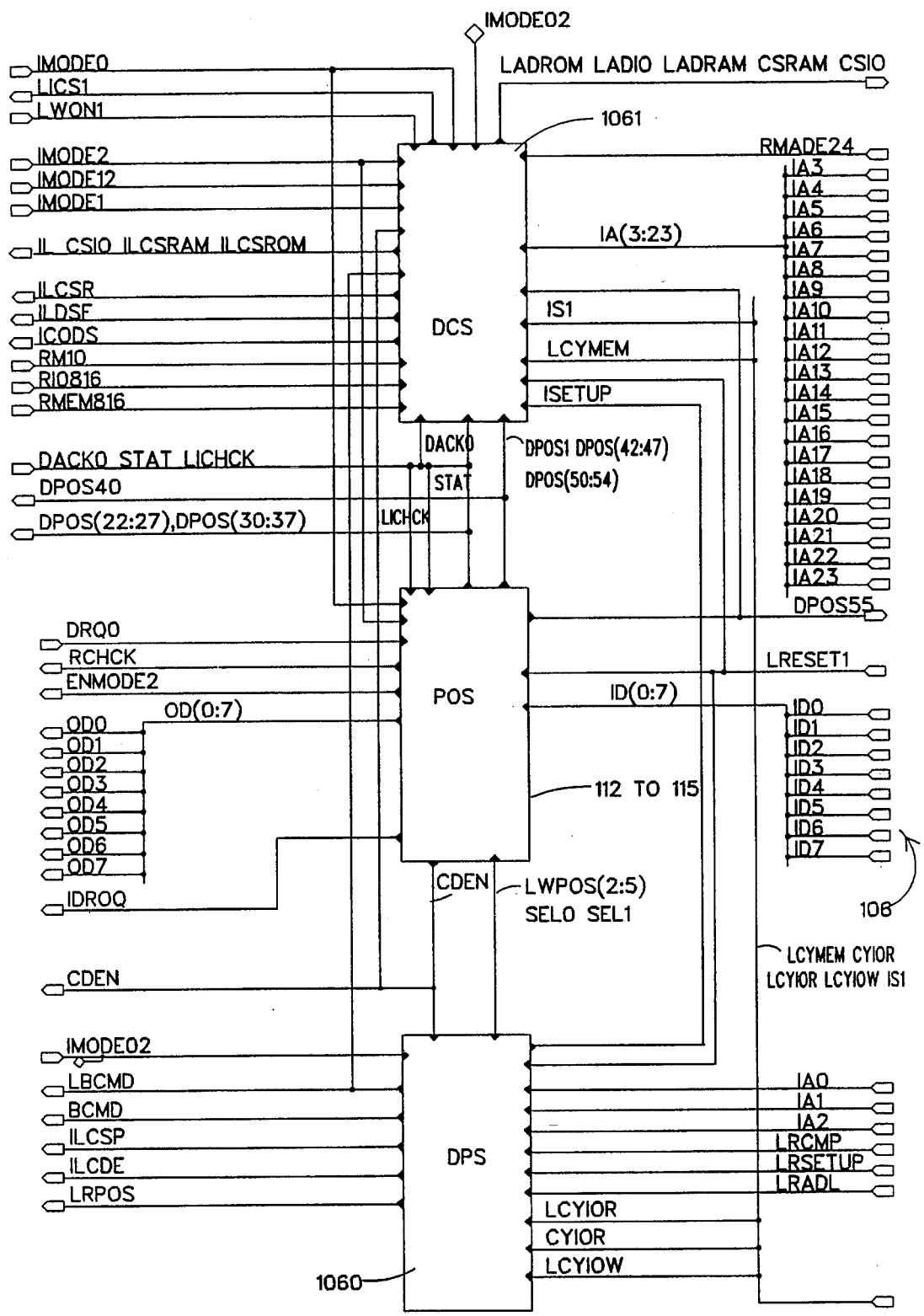
FIG. 6A is a more detailed functional diagram of the decode logic of FIG. 1.

FIG. 6A shows in greater detail the logic blocks of decode circuit (106) which is composed mainly of a logic block of POS registers 112 to 115, a logic block DPS (1060) for commanding the POS registers, and a logic block (1061) DCS generating selection signals, either from input-outputs or from random access memory RAM or from read only memory ROM as a function of the addresses presented on the address bus.

Figure 6B:
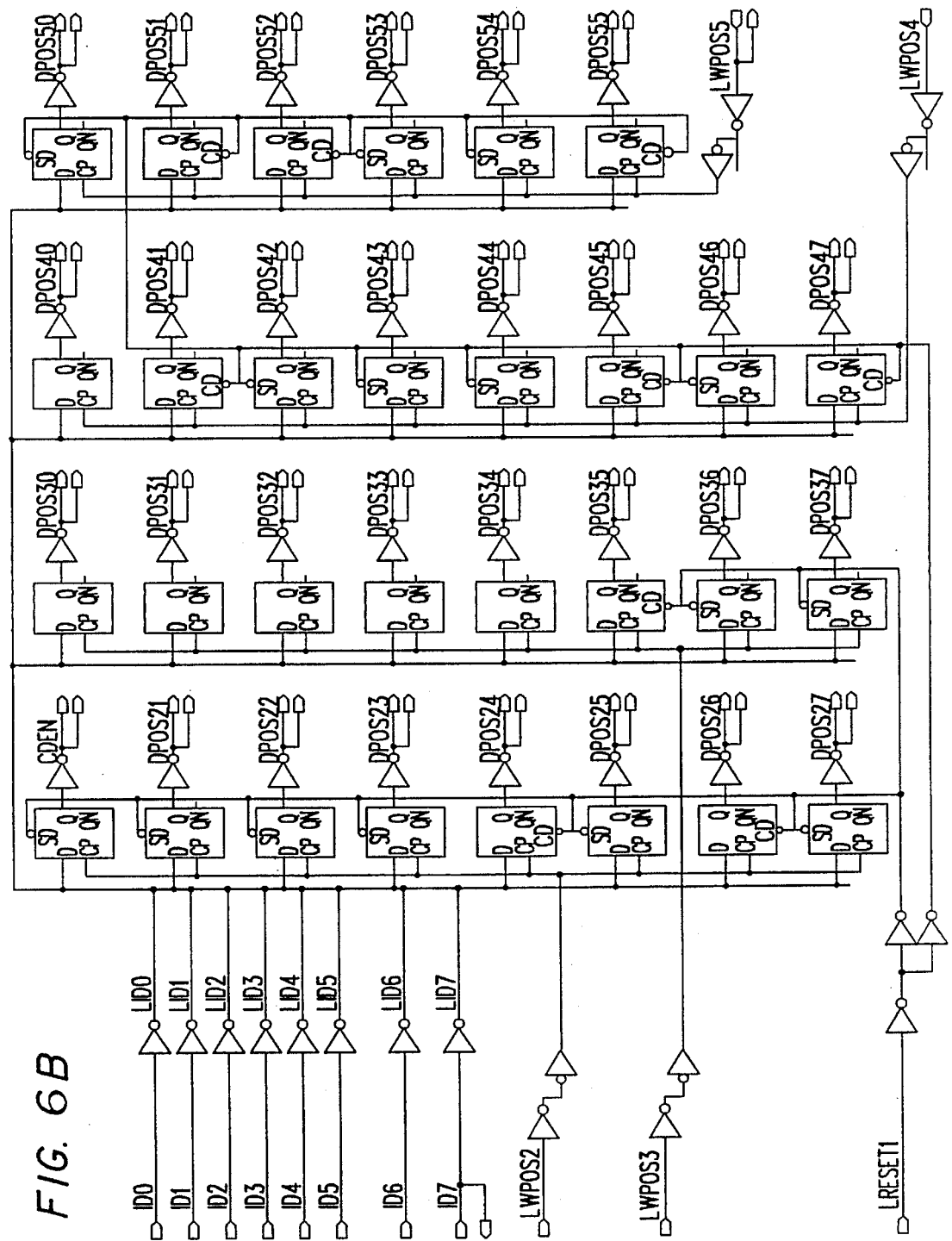

FIG. 6B is the detailed logic diagram of the POS registers composed of flip-flops whose outputs DPOSXY indicate the number by X, and can be loaded from data bus ID0–ID7 in synchronization with signals LWPOS2, LWPOS3, LWPOS4, and LWPOS5 selecting each of the registers in the write or read modes.

Figure 6C:
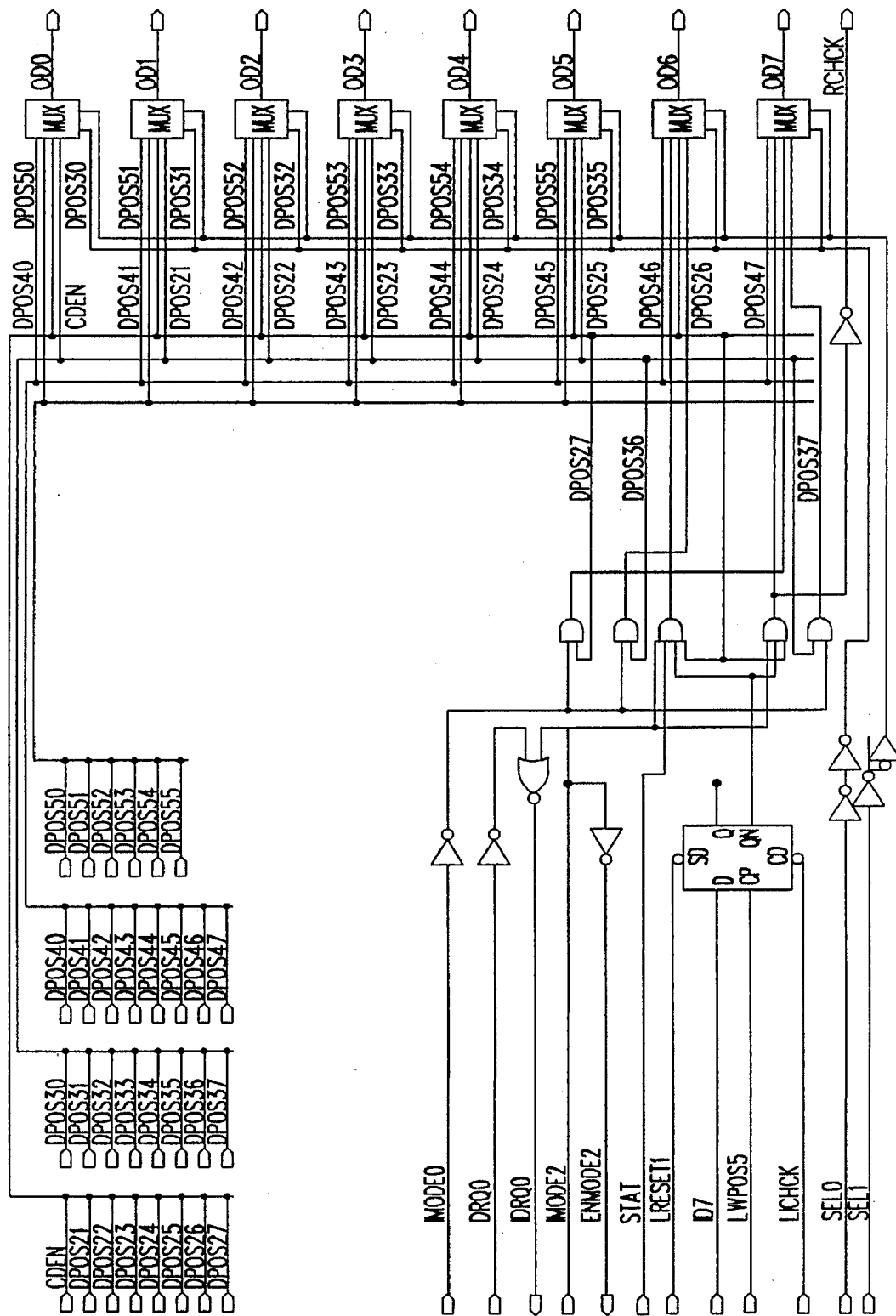

FIG. 6C shows the multiplex logic enabling selection, in the read mode, of any of the four paths constituted by outputs DPOSXY of each of the four registers of which each of the significant bits is sent to a four-input multiplexer and an output ODY, Y being the corresponding number of bits.

FIG. 6D shows the general logic of the POS register selection signals, particularly signals LWPOS2 to LWPOS5 which enable the POS registers and signals SEL 0, SEL 1 which command the multiplexers to be selected or set up. The various signals are generated by decoding addresses IA0 to IA2 of address bus MCA and signals LRSETUP, LRADL, LRESET 1, LCYIOW, LCYIOR, CYIOR and MODE 02.

Figure 6E:
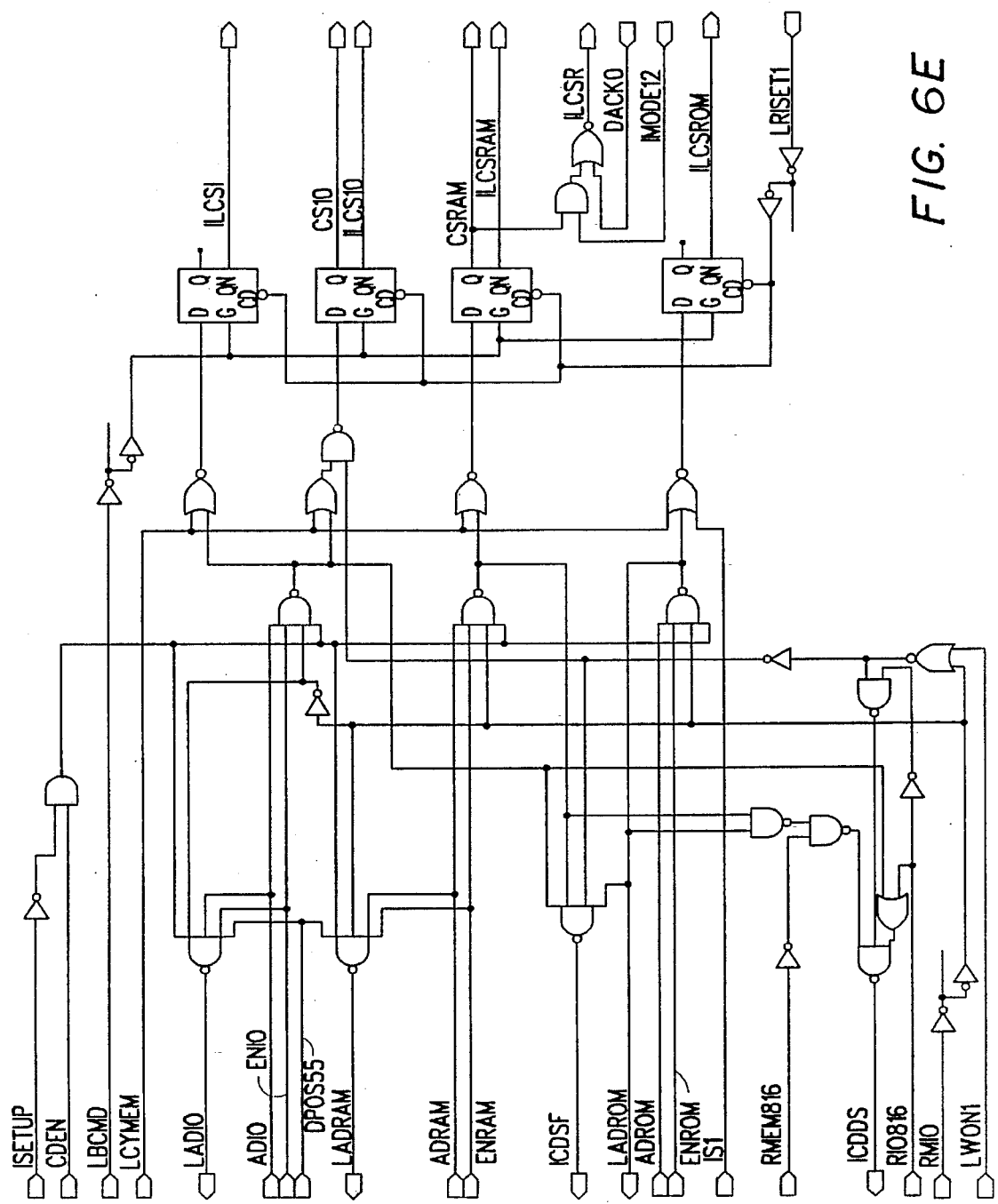
Figure 6F:
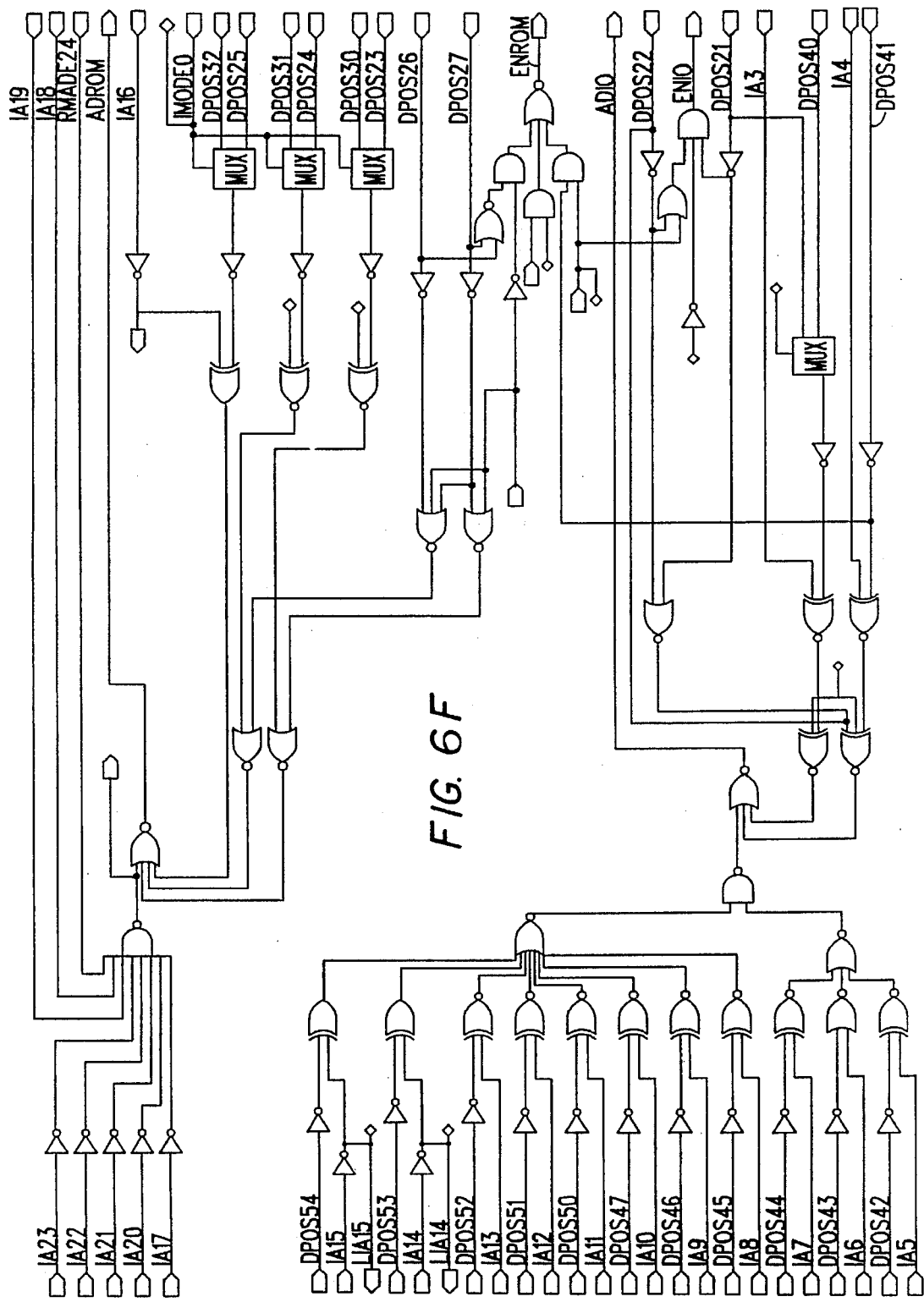

FIGS. 6E and 6F are the logic diagrams of the circuits that select inputs-outputs by the CSIO signal, random access memory RAM by the CSRAM signal, and read only memory ROM by the LCSROM signal.

These signals are generated by processing the various MIO signals from the MCA bus and MEM816, IO816 from the card and indicating the bus size from these signals, for example by selecting inputs-outputs obtained by comparing addresses A3 to A15 with bits 1 to 7 of the POS4 register and bits 0 to 4 of the POS5 register. Likewise, comparison of addresses A16 to A23 with bits 0 to 2 of the POS3 register forming the word SEGROM in mode 0 or with bits 3 to 5 of the POS2 register in mode 2 and bits 6 and 7 of register POS2 in mode 02 allow generation of the read only memory ROM selection signal by intermediate signal ADROM.

Figure 6G:
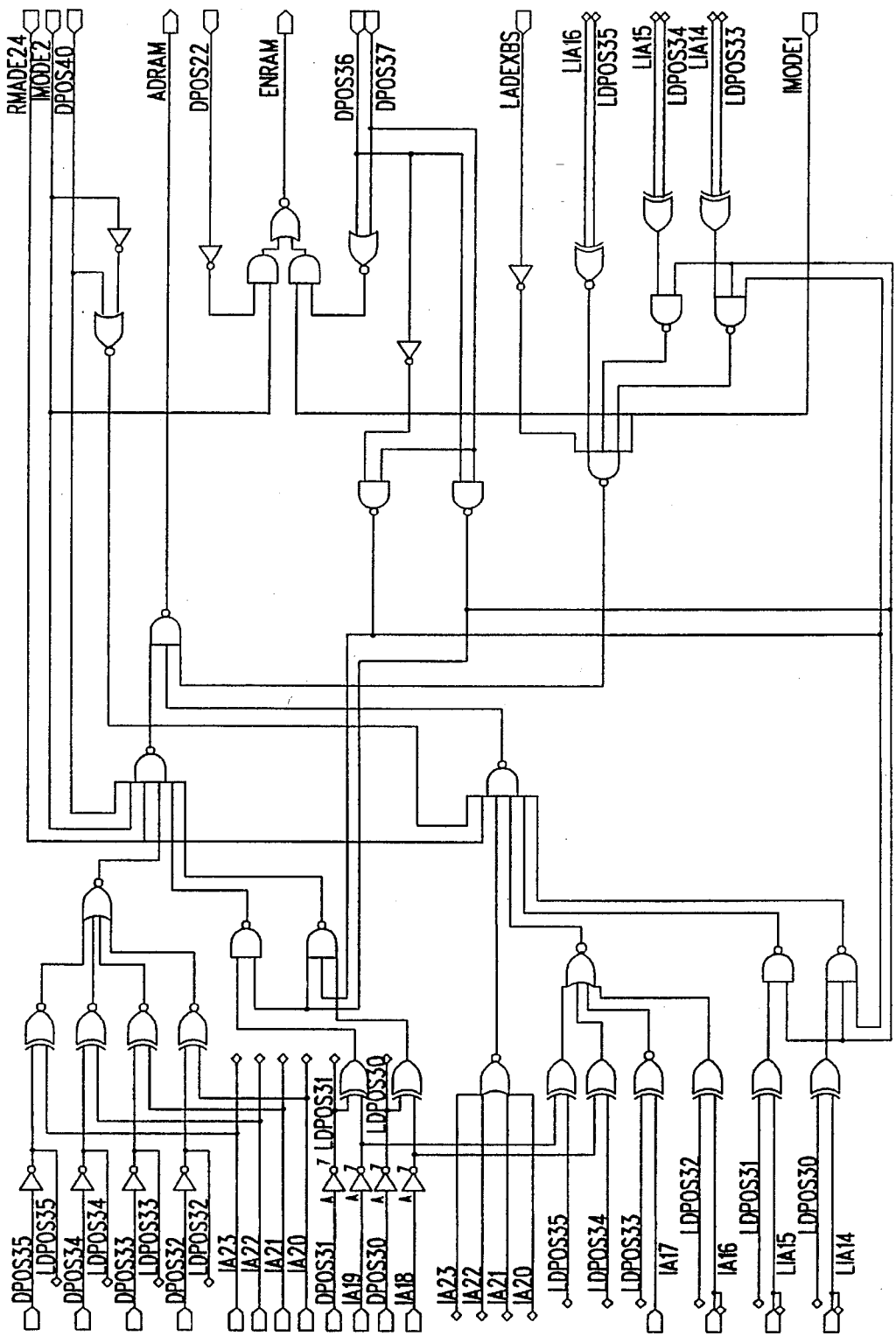

FIG. 6G is the circuit selection logic diagram that selects the RAM memory. In mode 1 this logic makes a comparison between low address bits A14 to A16 furnished by the MCA bus with bits 3 to 5 of the POS3 register constituting the SEGRAM information to form an ADRAM address enable signal. A RAM memory enable signal ENRAM is formed either by combining bits 6 and 7 of the POS3 register in the case of mode 1 operation or by bit 2 of the POS2 register in the case of mode 2 operation of the circuit. These signals produce the ENRAM signal by addition. The address enable signal is also to be produced in mode 2 by comparing address bits A14 to A19 furnished by the address bus with bits 0 to 5 of the POS3 register or by comparing bits A18 to A23 furnished by the address bus with the same bits of the POS3 register, this comparison being made according to the value of the MADE24 signal indicating extension of the addresses to 16 megabits.

Figure 7A:
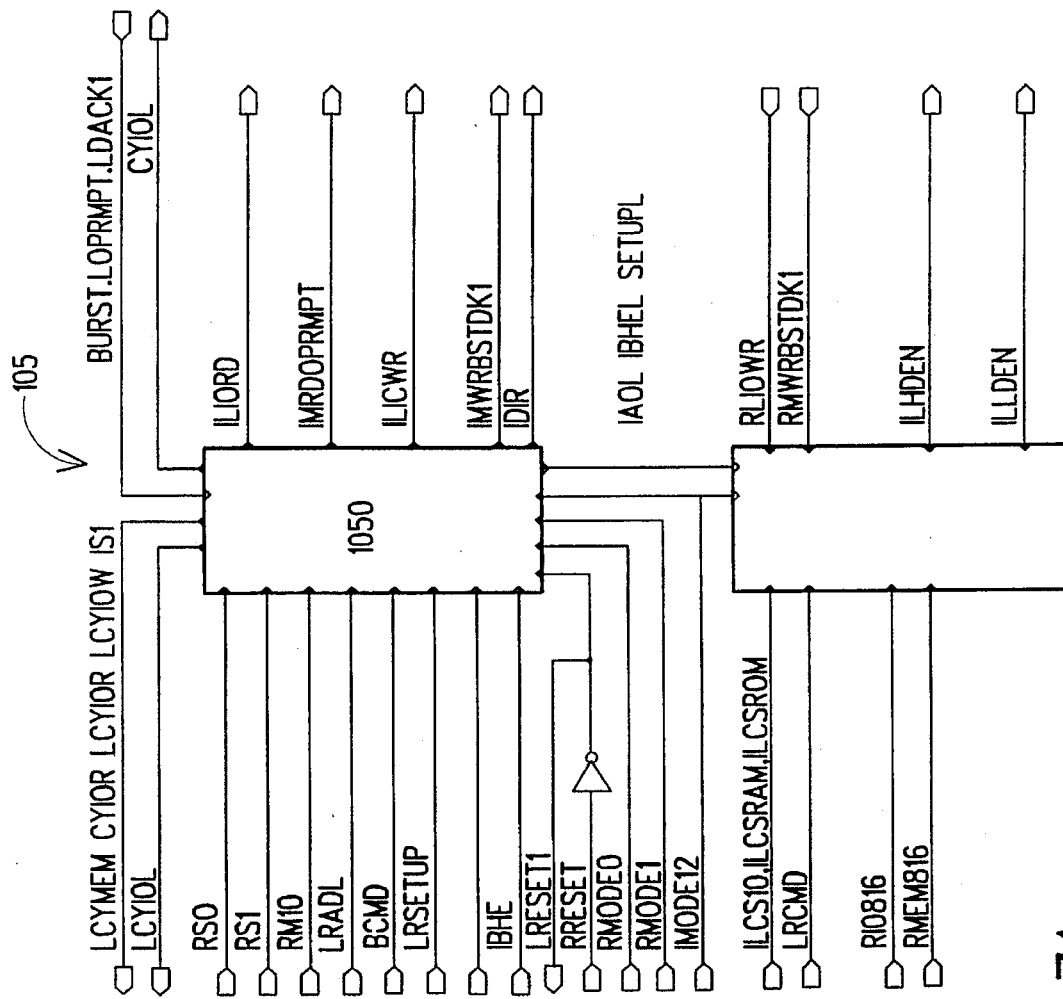
FIG. 7A is a more detailed functional diagram of the command logic of FIG. 1.

FIG. 7A shows the breakdown of command logic circuit 105 into two logic blocks (1050, 1051). The first (1050) furnishes the commands from the various elements that may be associated with this arbitration circuit such as a memory, inputs-outputs, or buffer registers. This circuit 105 also has a logic block (1051) BUF forming the buffer selection signals, which, as will be seen below in the applications, may be associated with this arbitration circuit.

Figure 7B:
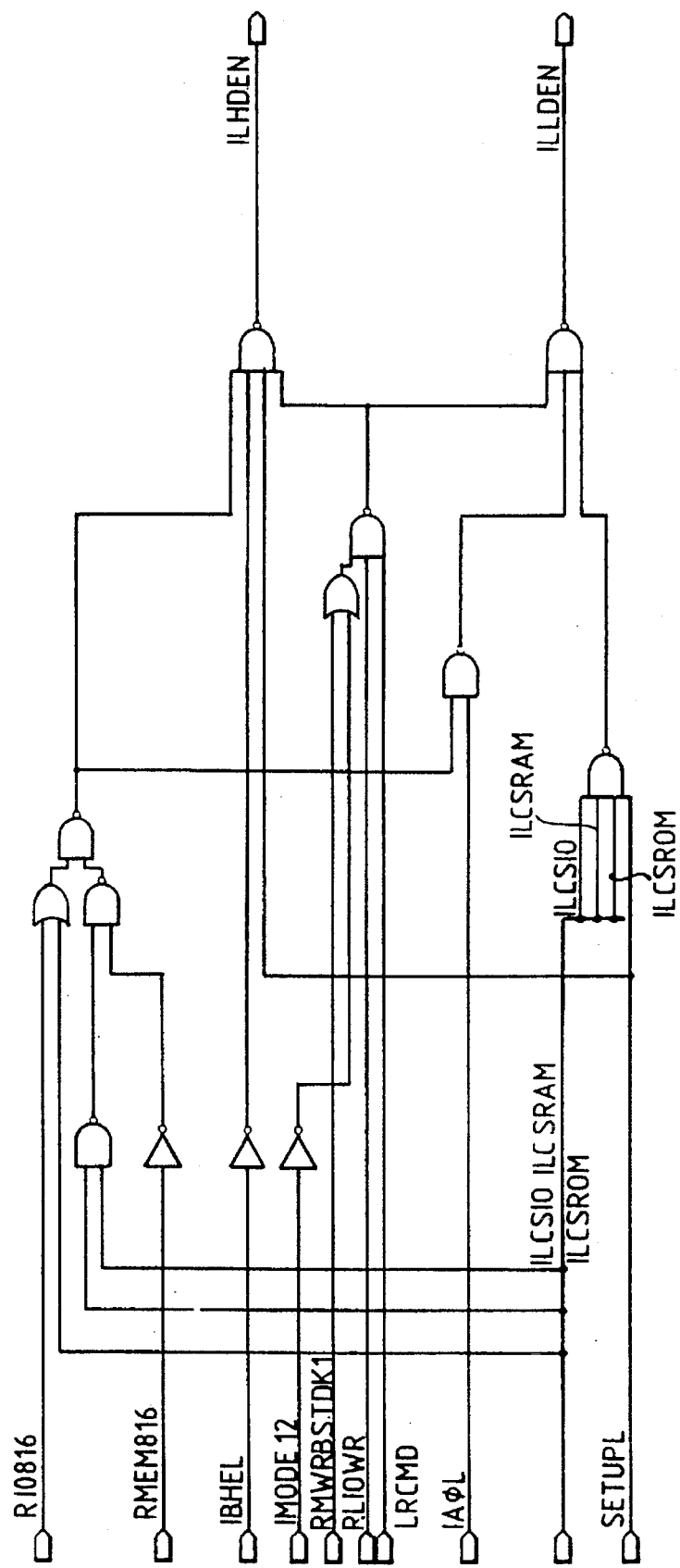
FIGS. 7B to 7C are diagrams showing the command logic of FIG. 7.

FIG. 7B shows production of the ILHDEN and ILLDEN signals from external signals IO816 and MEM816 as LIOWR, MWRBSIDK1, CS10, CSRAM, CSROM and from a signal indicating operation in mode 1 or 2 (mode 1, 2).

Figure 7C:
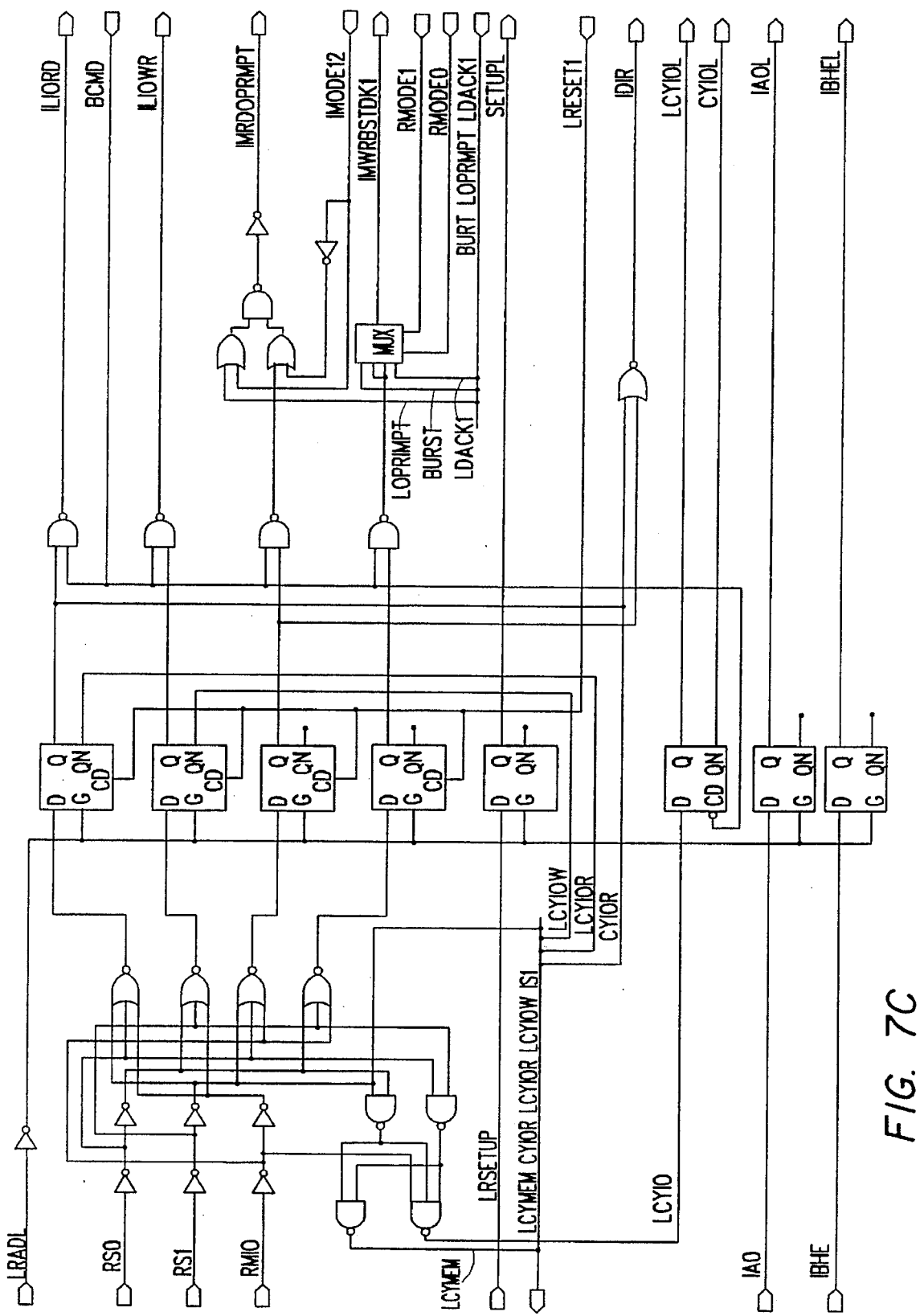

FIG. 7C is the detailed logic diagram of block (1050) which produces outputs MWIRBSTDK1 as a function of the modes used and the BURST OPRMPT and DACK1 signals and the MRDOPRMIT signal, also as a function of modes 1 or 2 or mode 0 and 3. These circuits also produce internal signals from inputs SO to S1 indicating the start of a cycle, with MIO indicating whether the cycle is a memory or an input-output cycle, and LADL which ensures that the cycle is running properly by means of the address decode latch (lock). This information is used to generate internal signals LCYMEM indicating a memory cycle, CYIOR indicating an input-output read cycle, and LCYIOR, LCYIOW indicating an input-output write cycle.

Figure 8A:
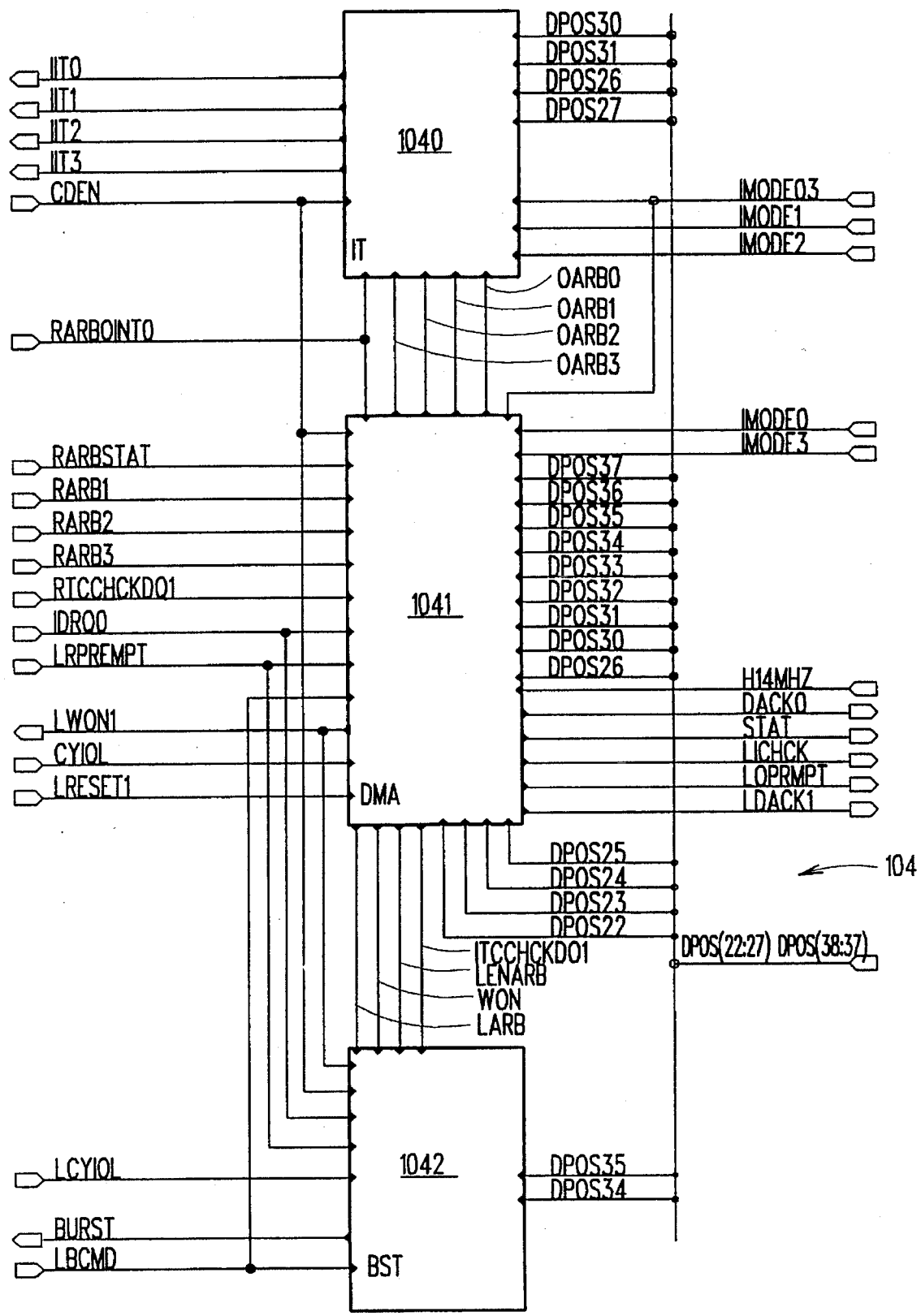
FIG. 8A is a more detailed functional diagram of the arbitration logic of FIG. 1.

FIG. 8A is the breakdown of an arbitration logic circuit (104) into a logic block (1040) handling interrupts, a logic block (1041) measuring arbitration, and a logic block (1042) generating the BURST signal.

Figure 8B:
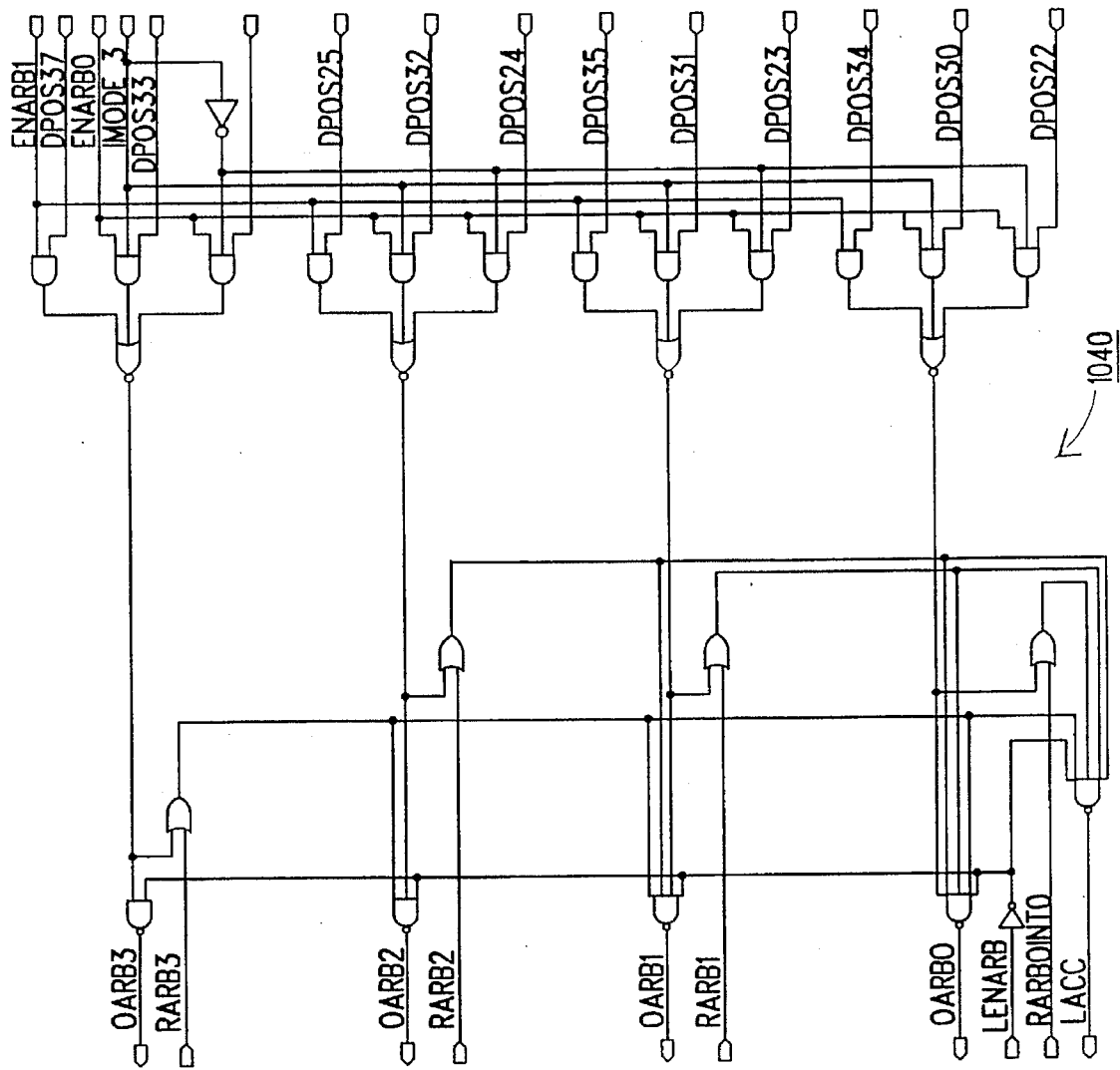
FIGS. 8B to 8E are diagrams showing the arbitration logic of FIG. 8A.

FIG. 8B shows the detailed logic diagram of part of logic block 1041 producing, from signals from arbitration level[s] RARB0 to RARB3 coming from the MCA bus and bits 2 to 5 of the POS2 register in mode 0 or bits 0 to 3 or 4 to 7 in mode 3 depending on the arbitration channel enabled by signal ENARB1 or ENARB0, signals OARB0 to OARB3.

Figure 8C:
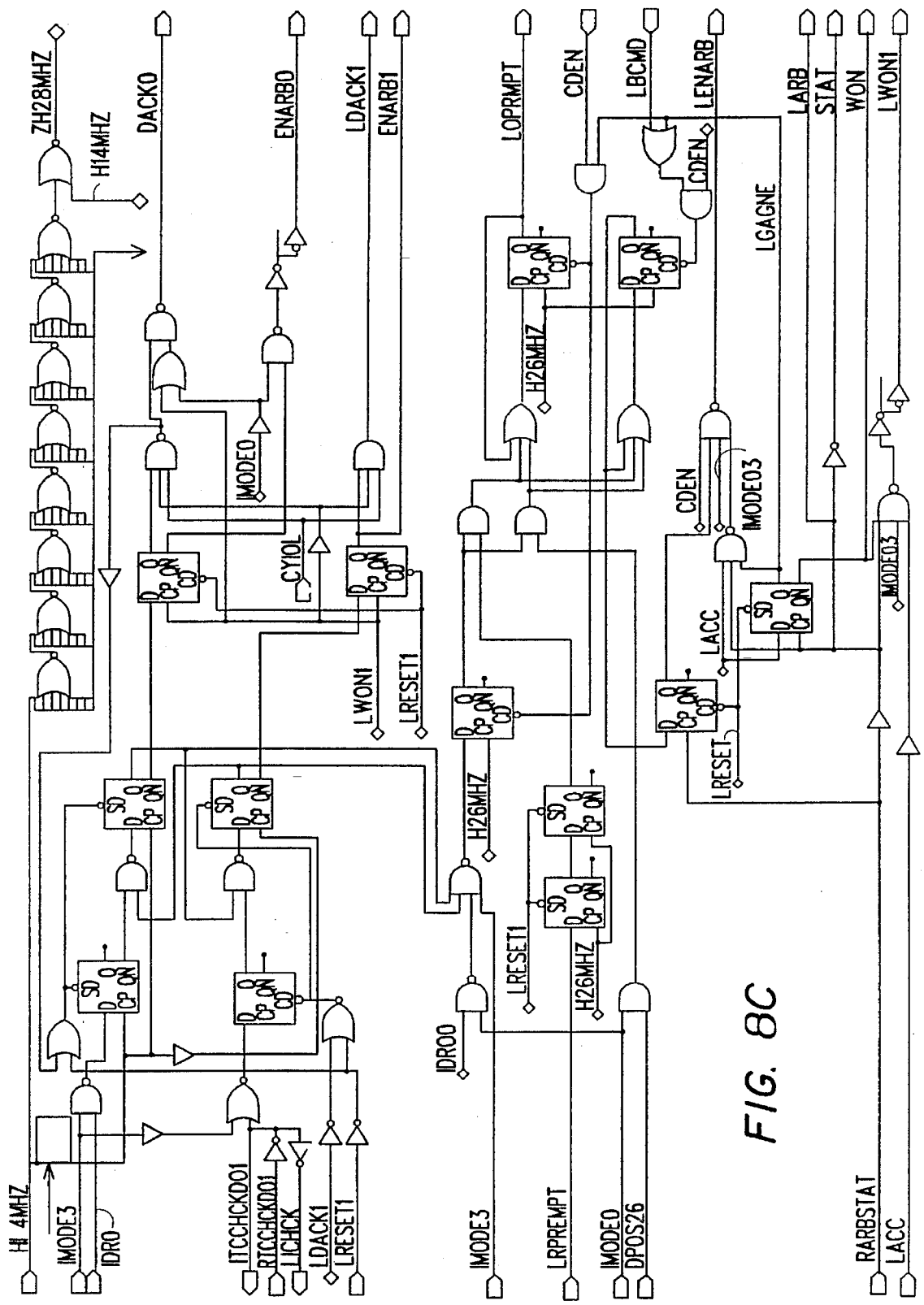

FIG. 8C is the detailed logic schematic of the part of logic block 1041 that allows signals ENARB0 to ENARB1 to be produced as well as other arbitration signals by using mode signals, acknowledge signals LDACK1, and request signals on bus LOPRMPT.

Figure 8D:
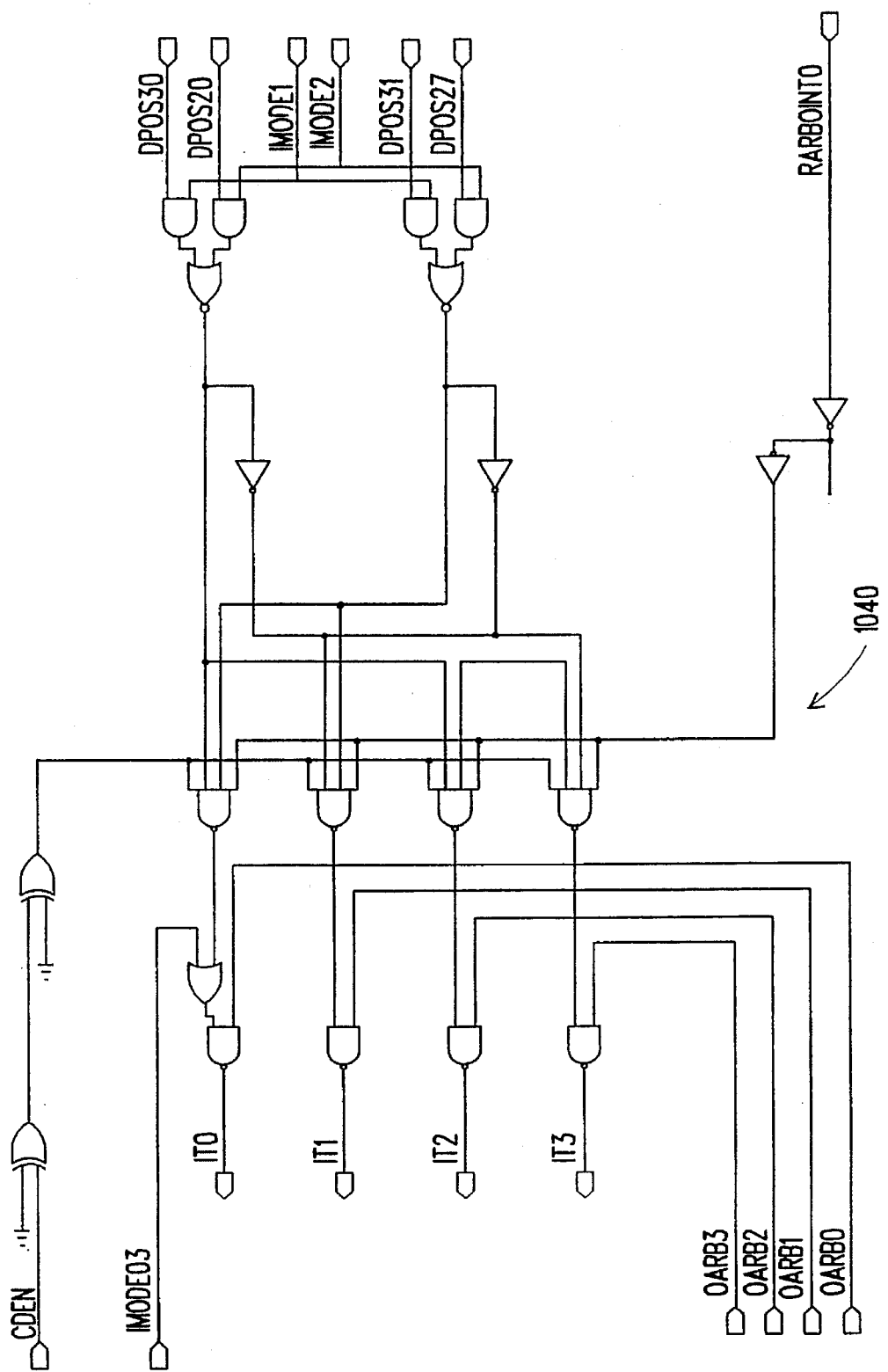

FIG. 8D shows the detailed logic diagram of logic block IT (1040) generating the interrupt levels in the arbitration procedure bearing in mind, on the one hand, arbitration numbers OARB0 to OARB3 furnished by arbitration circuit DMA and the values of bits 0 and 1 of the POS3 register in mode 1 constituted by the NIT information and by bits 6 and 7 of register POS2 in mode 2.

Figure 8E:
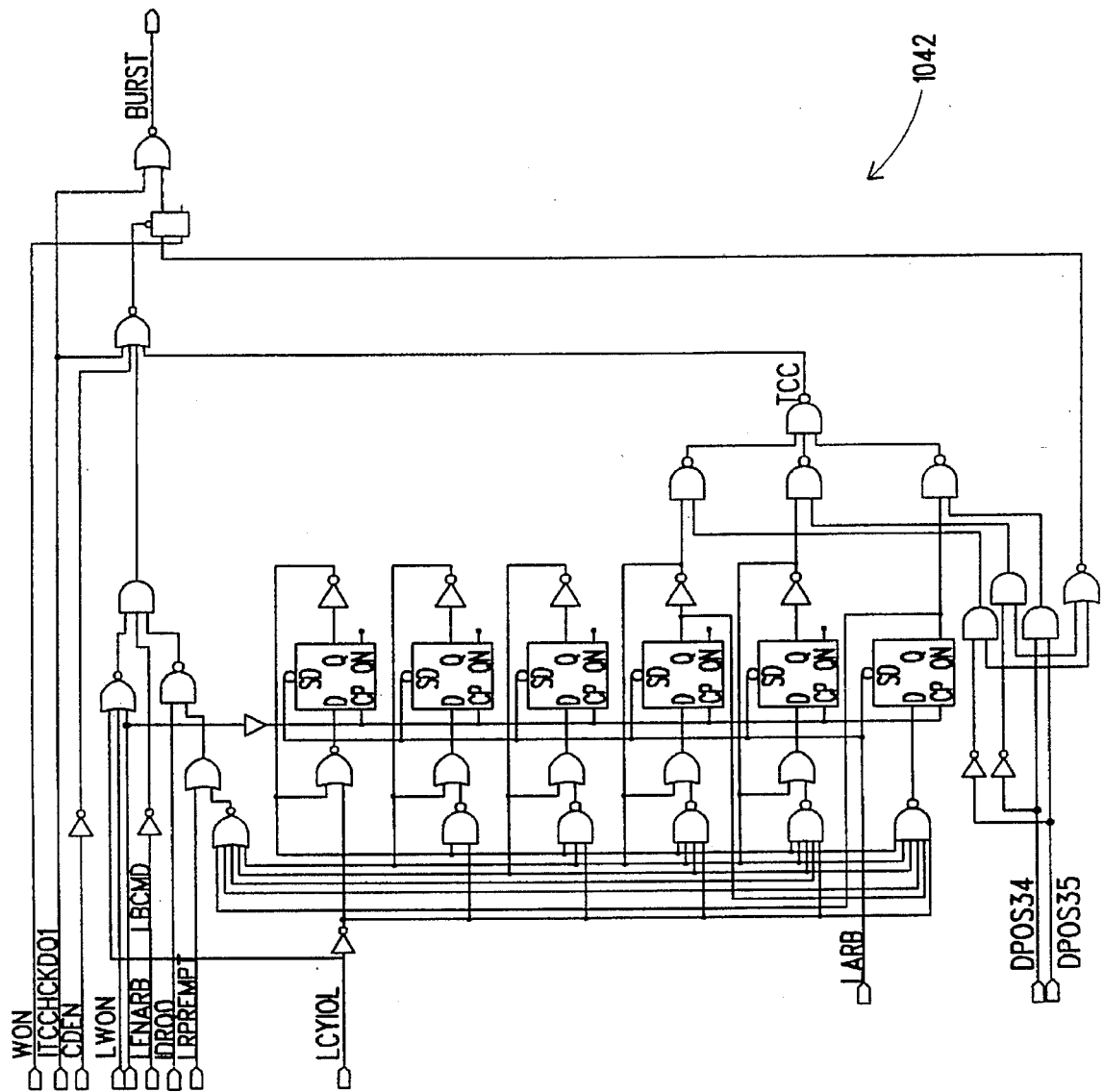
Figure 19:
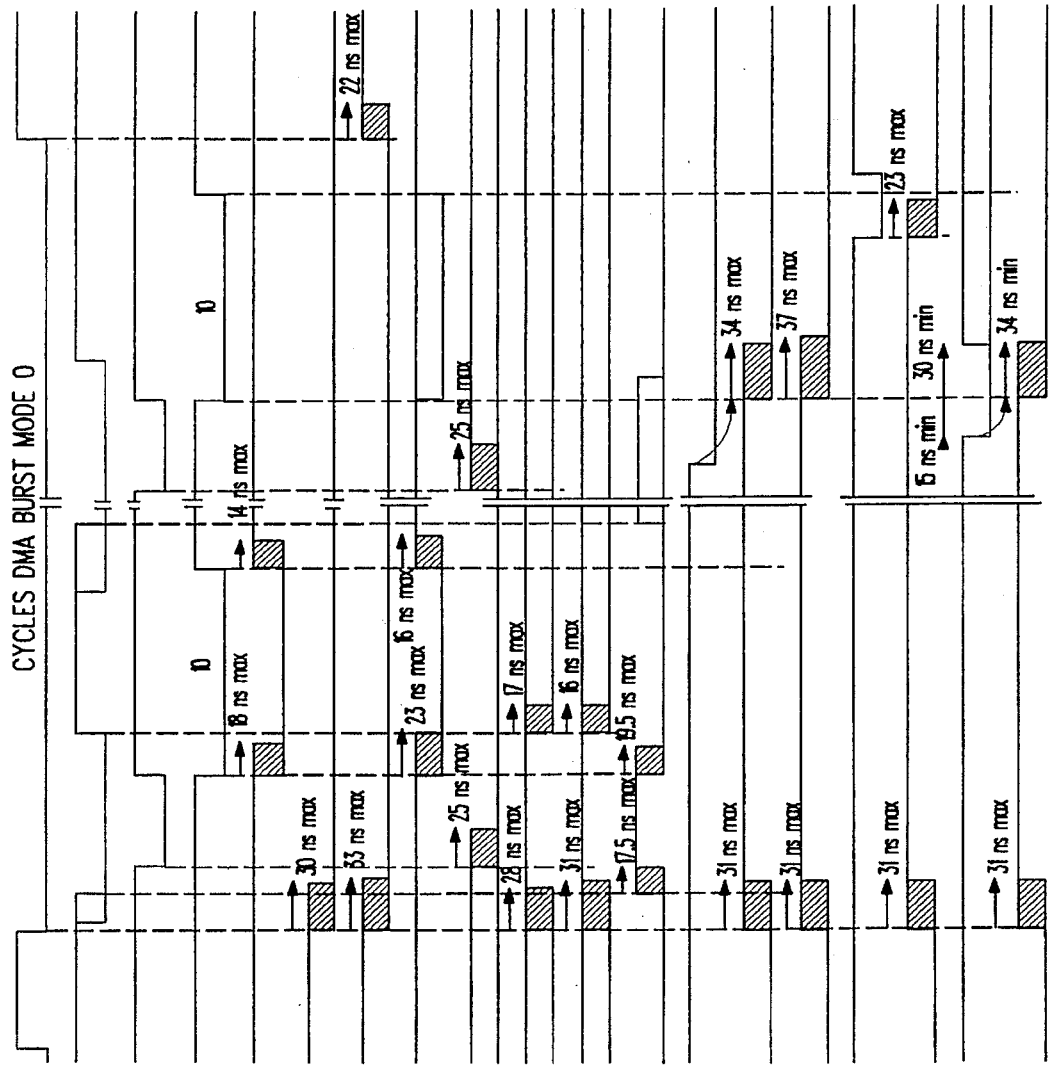
FIG. 19 shows the signals necessary for a BURST direct memory access cycle according to mode 0.

FIG. 8E is the detailed logic diagram of logic block (1042) generating the BURST signal. This signal is produced from bits 4 and 5 of the POS3 register and from signals CDEN, LBCMD, LRPREMPT, LARB, ITCCM-CKDD1, LWON1, LCYIOL, IDRQO in order to satisfy the DMA cycle with a burst in mode 0 as shown in FIG. 19.

Figure 9:
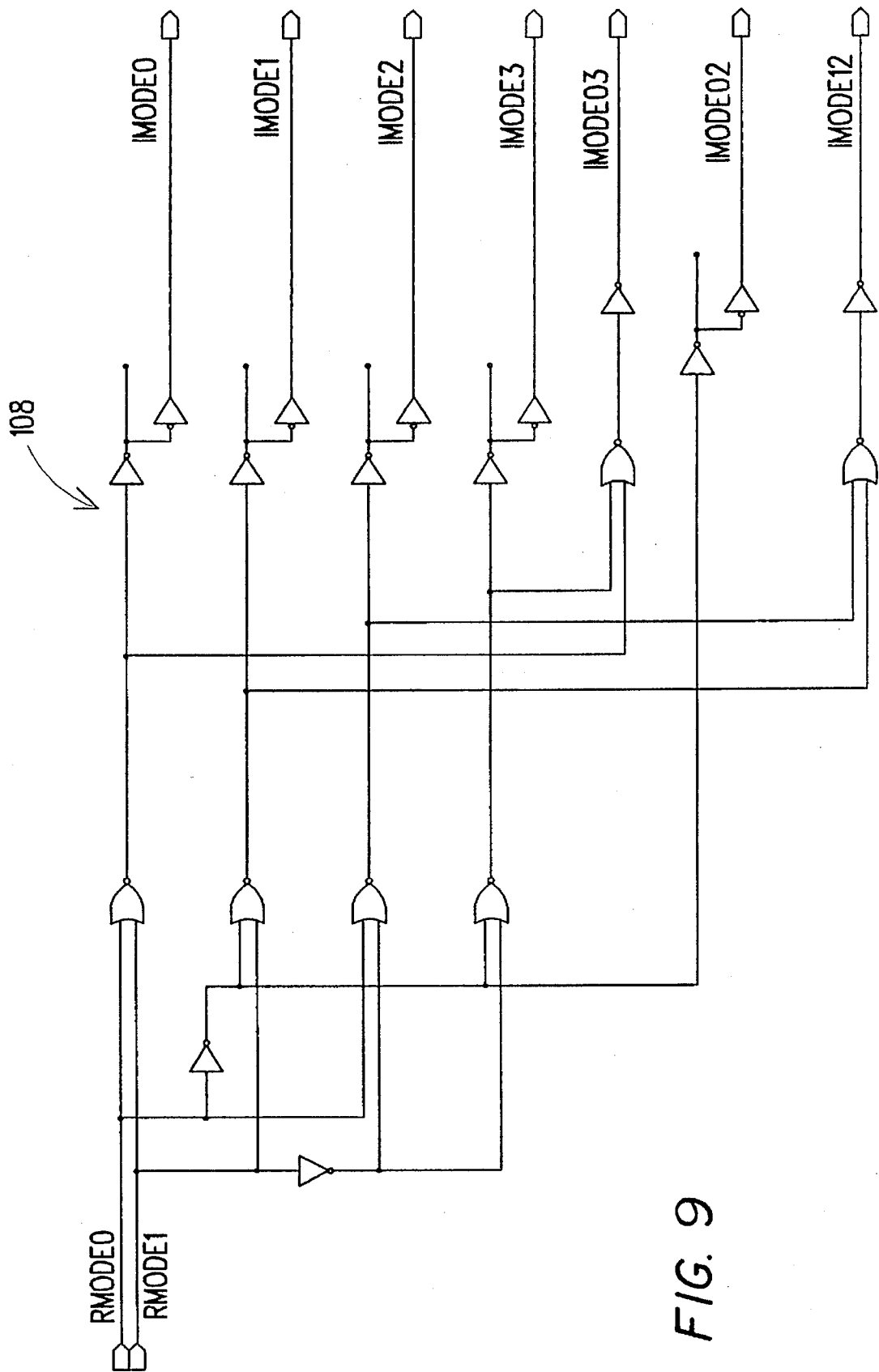
FIG. 9 is a diagram showing the decode logic of the operating mode of the circuit in FIG. 1.

FIG. 9 represents the detailed logic diagram of mode decode circuit (108) that, from signals RMOD0 and RMOD1 available at input pins 3334, allow these signals to be decoded in the form of four signals MODE 0, MODE 1, MODE 2, MODE 3 and additional signals MODE 12, MODE 02, MODE 03 necessary for exploiting and selecting certain information contained in the POS registers by means of the circuits described above.

Figure 10:
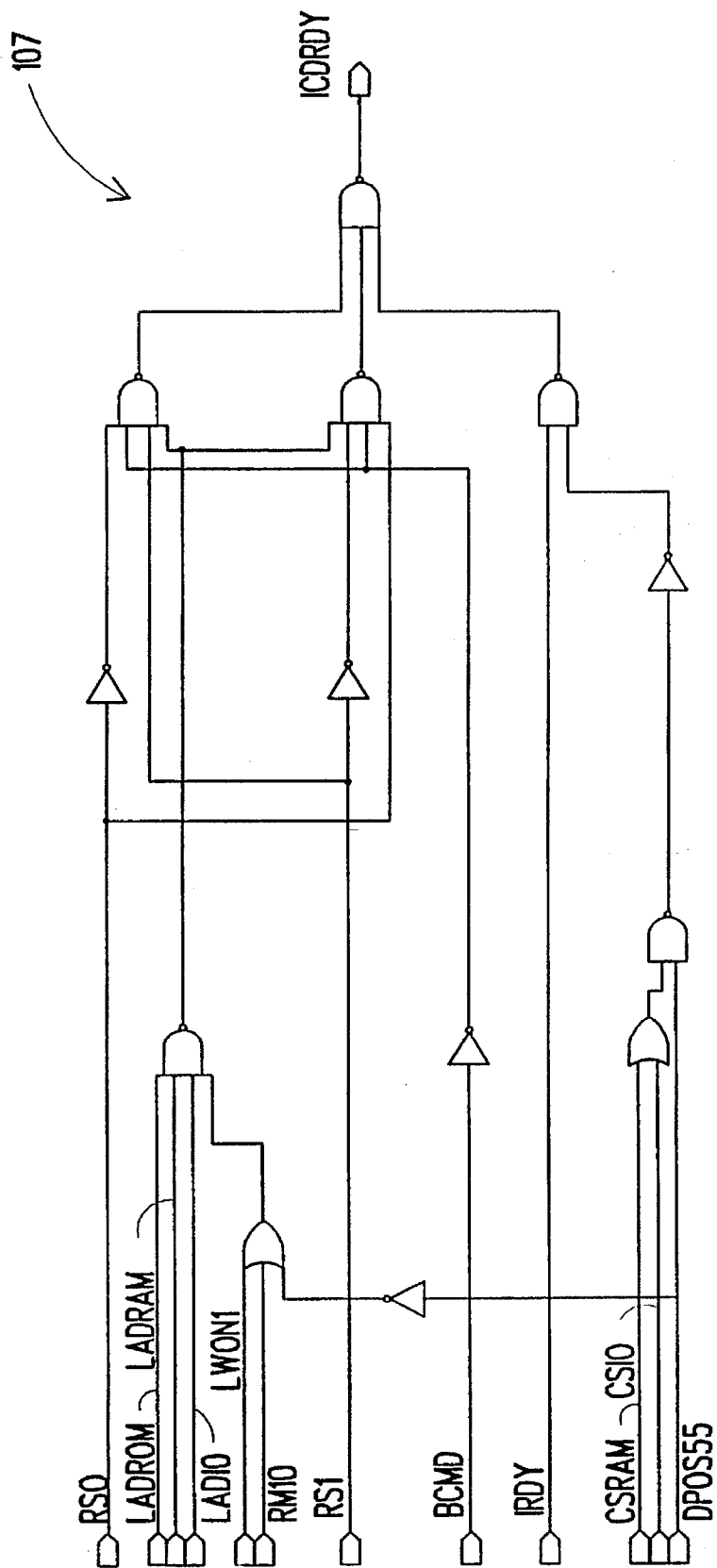
FIG. 10 is the diagram showing the "ready" signal logic.

FIG. 10 is the detailed logic diagram of the circuit generating the ready signal upon reception of the IRDY signal to form the ICDRDY signal intended for the MCA bus by using signals indicating a memory cycle LADROM, LADRAM or an input-output cycle LADIO, as well as by using signals selecting the random access memory or inputs-outputs, CSRAM and CSIO respectively, and by using bit 5 of the POS5 register constituting the RDY information. This circuit also uses signals RMIO and LWON1.

Thus, the integrated circuit represented, once installed on a card, permits the following functions depending on the information contained in the registers, whatever the operating mode used:

setup of integrated POS registers (112 to 115);

control of data buffer registers by signals DIR, LLDEN, and LHDEN;

generation of read or write input-output commands with signals LIORD and LIOWR;

decoding a read only memory ROM field by generating signal LCSROM, this field being programmable in terms of position and size in the ROM memory space of the BIOS extension defined by POS register (112);

decoding an input-output (IO) field by the LCSIO signal, this field being programmable in terms of position and size in the input-output (IO) space defined in the POS registers (112, 114, 115);

management of READY channel signal (CDCHRDY) to obtain a synchronous cycle at 300 ns or an asynchronous cycle higher than 300 ns with the local input (RDY);

generation of CDSFDBK signal generation of CDDS16 signal for a 16 bit field;

local inputs of signals MEM816 and IO816, defining the width of the memory or input-output data bus.

For modes 0 and 2, this circuit also allows selection of POS registers (110, 117) by sending signal (LCSPOS) and generating card enable signal (LCDEN). For mode 0, this circuit implements:

the function of management of a DMA channel in the single or burst mode, authorizing a channel by defining the burst size and the arbitration level programmable in register (113);

generation of the DACK signal after participation in an arbitration phase following a DRQ request.

In modes 1 and 2, this circuit implements the memory command generation functions by furnishing signals (LMEMRD) and (LMEMWR) and the random access memory RAM field decode function by furnishing signal (LCSRAM), this field being programmable in terms of position and size in the system memory space by the POS registers (112, 113, 114) in mode 2 and the POS register (113) in mode 1.

This circuit also furnishes the multiplex function of one local interrupt line out of four interrupt levels defined by POS register (102) in mode 2 and by POS register (113) in mode 1. Also, in mode 2, this circuit furnishes the signal generation function (CHCK) and management of bits 6 and 7 of the POS register (115) with local inputs (ICHCK) and (STAT).

In addition, in modes 1 and 3, this circuit furnishes the selection function of the external identification registers by sending signals (OEID0) and (OEID1).

Finally, in mode 3, this circuit adds to the functions of modes 1 and 3 and in common to the four modes, a function of management of two DMA channels in the single mode with internal arbitration and programmable arbitration level in POS register (113) and a signal (DACK0) or (DACK1) generation function after an MCA arbitration phase following a request (DRQ0) or (DRQ1), the fairness mode always being active.

It will be noted that this circuit allows control of generation of the identifiers necessary for operation with an MCA bus by decoding the POS (110) and POS (111) addresses and commanding access to the registers in modes 1, 2, and 3. In the hardwired identifier mode for a card containing no read only memory of the PROM type, the circuit generates signals (OEID0) or (OEID1) with (LA0 at 0 or 1) in order to control the external buffer generating the coupler card identifier.

In mode 0, in a nonhardwired fashion, in the case where the coupler card has a read only memory which furnishes this identifier locally after a period. In this case, the circuit generates an identifier request directed to the local interface and opens the coupler data buffer sending signal (CDPOS) with (LAO-2 at 0 or 1).

Thus, depending on the operating modes selected, this circuit can be used in various applications shown in FIGS. 6 to 9.

Figure 11:
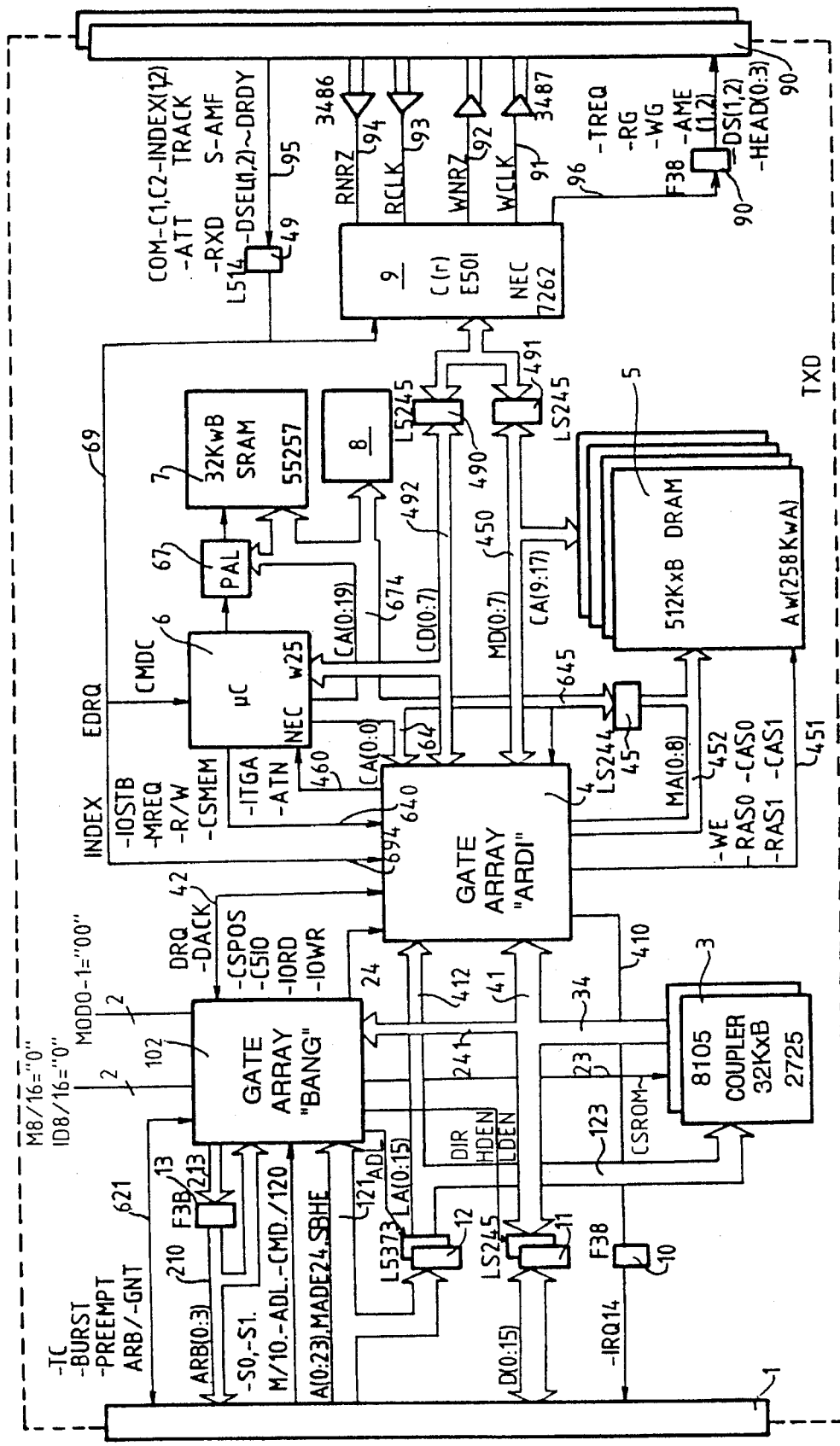
FIG. 11 shows one application example of the integrated circuit in an ESDI card.

FIG. 11 is the schematic diagram of an intelligent interface disk controller card. This card is connected to a bus (1) of the MCA (Micro Channel Architecture) type via a bus arbitration integrated circuit (102) which is the interface between bus (1) and the circuits on the card. For further details on this integrated circuit (102), see the patent application filed by Bull S.A. entitled "MCA Bus Arbitrator Integrated Circuit and Applications of Such a Circuit."

This circuit (102) manages, by means of signal (CSROM) sent over line (623), the accesses to a memory (3) of the EPROM type which contains the BIOS (Basic Input/Output System) part of the disk interface. A coupler circuit (4) physically provides the input-output interface between the central processing unit and a microprocessor circuit (6) as well as the interface between a CACHE memory (5) composed of dynamic random access memories and a disk controller circuit (9). Coupler circuit (4) is connected to disk controller circuit (9) of the type marketed by NEC under number 7282, by two separate data buses, and one bus MD (0:7) (450) connecting coupler circuit (4) of CACHE memory (5), and the other bus CD (0:7) (492) connecting the disk controller both to microprocessor (6) and to coupler circuit (4). Coupler circuit (4) receives the data from MCA bus (1) via bus (41) that interfaces with this MCA bus (1) via buffer registers (11) commanded by signals DIR, LDEN, and HDEN from arbitration circuit (102).

A bus (34) also allows EPROM memory (3) containing the BIOS interface program to be connected with bus (41). A bus (241) connects this bus (41) to interface coupler (2) for the MCA bus. Coupler circuit (4) also receives, via a bus (412), addresses LA (0:15) coming through buffer circuits (612) from address bus A (0:23) (121) which connects MCA bus (1) to interface coupler circuit (102). These buffer circuits (612) are commanded by signal (ADL) from arbitration circuit (102). Signals (MA, OE24, SBHE) also pass through this bus (121). A control bus (120) allows signals (S0, S1, M/IO, DL, CMD) from MCA bus (1) to be received.

Coupler interface circuit (2) transmits via bus (213), interfaced by a buffer register (13), and receives signals ARB (0:3) via bus (210). A control bus (21) receives and transmits signals (TC, BURST, PREEMPT, ARB/-GNT). Interface circuit (2) sends, via control bus (24), signals (CSPOS, CSIO; IORD, IOWR). Circuit (2) receives or transmits via control lines (42), signals (DRQ, DACK). Coupler circuit (4) receives via line (694) the index signal coming from the disk and, via lines (640), signals (IOSTB, MRQ, R/W, REFRQ) coming from microprocessor circuit (6). Microprocessor circuit (6) also receives signals (ITGA) and (ATN) coming from coupler circuit (4) via lines (460). This microprocessor (6) is connected by an address bus CA (0:19) (674), with both coupler circuit (4) and static memory (7), and finally with EPROM memory (8) which contains the card operating program. Coupler circuit (4) sends control signals (WE, RAS0, RAS1, CAS0, CAS1) via link (451).

Disk controller (9) receives from disk connector (90), via lines (95), signals (CMDC, ATN, SCT, DSEL, INDEX, XACK, STSD, DRDY). Likewise, this circuit (9) receives via line (94), the read data signal (RNRZ); via line (93), the read clock signal (RCLK); via line (92), the write data signal (WNRZ); via line (91), the write clock signal (WCLK); and via line (96), interfaced by circuit (17), signals (XREQ, CMDD, RG, WG, AME, DS (0:2), HS (0:3)).

In this application, the arbitration circuit operates in Mode 0 and the memory and input-output data buses are fixed at 8 bits by the fact that inputs M8/16 and IO8/16 of the circuit are held at the low logic level.

Figure 12:
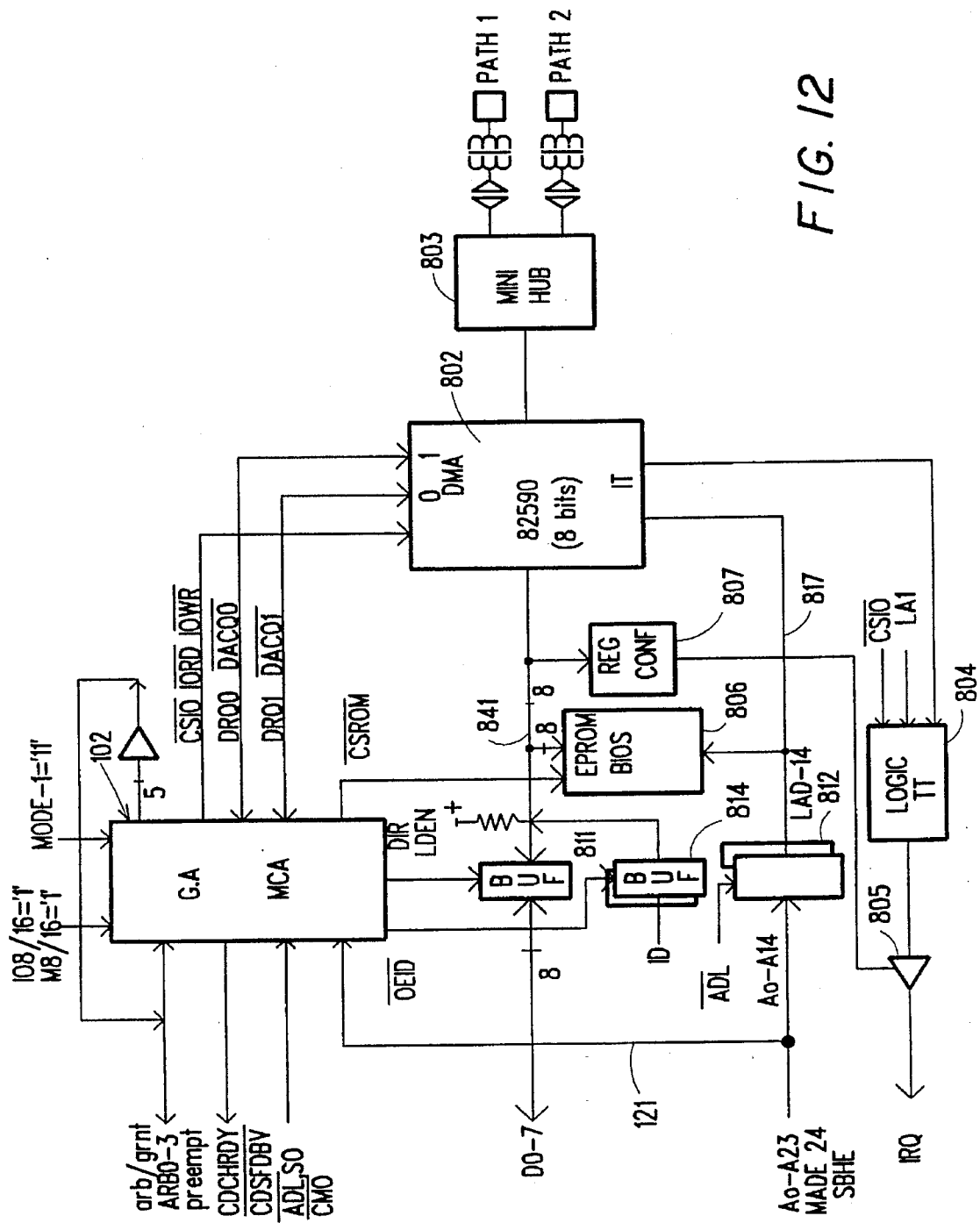
FIG. 12 shows one application example of the circuit in a minimum LAN card.

FIG. 12 represents a third application of the arbitration circuit wherein arbitration circuit (102) commands, via signals (DIR, LDEN), a buffer register (811) of the 8 bit data bus (841); by signals (LOEID), buffer registers (814) containing the card identifier, and by signal (LADL), the locked registers of address bus A0–A23 which is converted into a 14 bit bus (817). This circuit (102) is connected in mode 3 and at its inputs (IO818) and (MEM818) receives the signals allowing it to operate with an 8 bit input-output bus and an 8 bit memory bus.

Circuit (102) exchanges signals (ARB GNT, ARB0-3, LPREEMPT, LCDCHRDY, CDSFDBK, LADL, S0, LCMD, MADE24, SBHE) with the MCA bus. The circuit sends signal (LCSROM) to a PROM memory (806) which contains the BIOS and which is connected both to data bus (841) and to address bus (817). A configuration register (807) is also connected to data bus (841). On the data bus and on the address bus there is also connected a communications interface circuit, part number 82,590 (802) connected to a network physical interface (803) which communicates with two Telecom paths. Circuit (802) exchanges signals (LCSIO, LIORD, LIOWR, DRQ0, DRQ1, LDACK0, LDACK1) with the arbiter. Circuit (802) sends interrupt outputs IT to a logic (804) that multiplexes the interrupts and also receives signal (LCSIO) from circuit (102) and address signal (LA1) via register (812). This interrupt logic is connected at the output to an interrupt multiplexing logic (805) which emits signal (IRQ).

Figure 14:
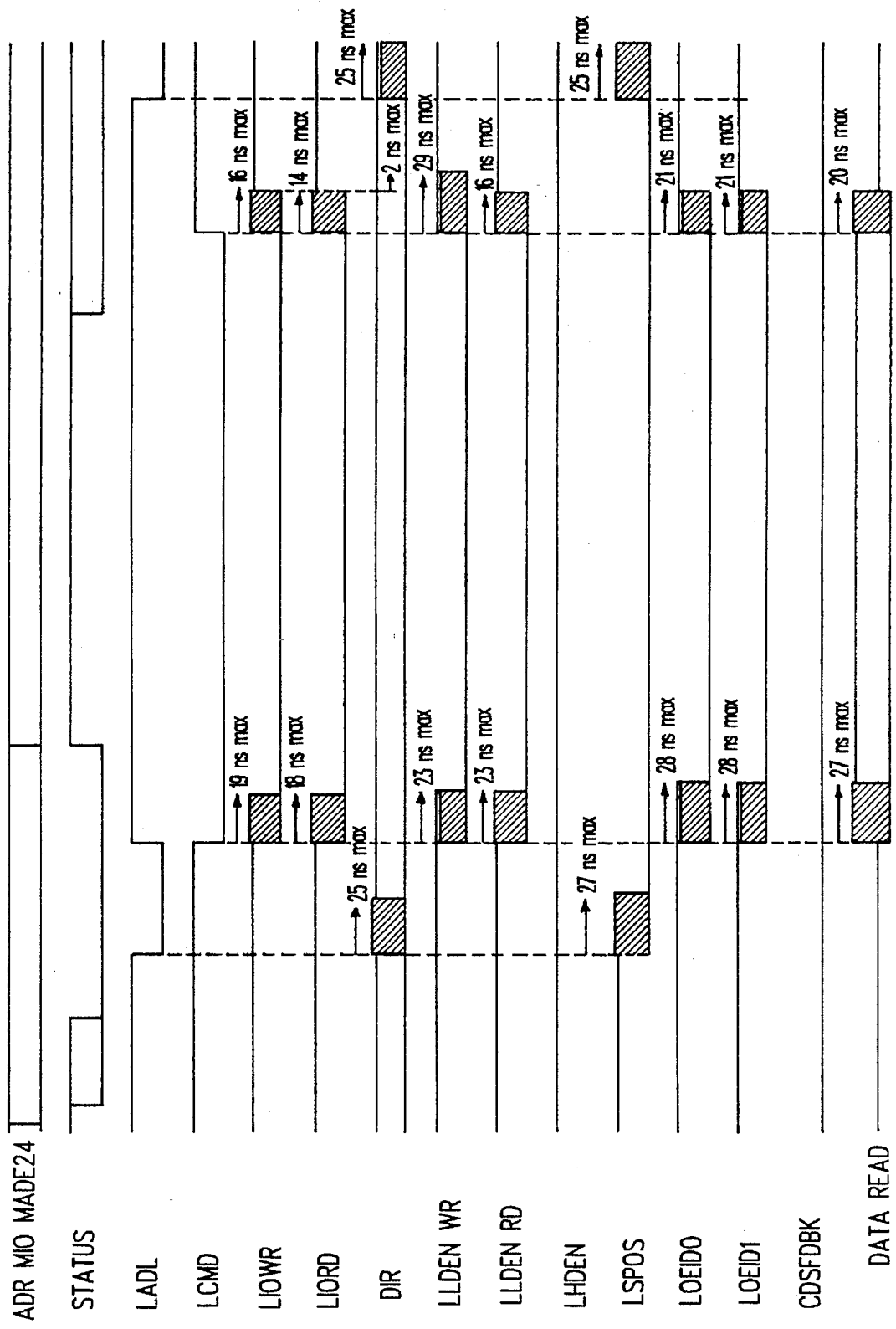
FIG. 14 shows the sequence of signals transmitted or received by the circuit during a setup cycle.
Figure 15:
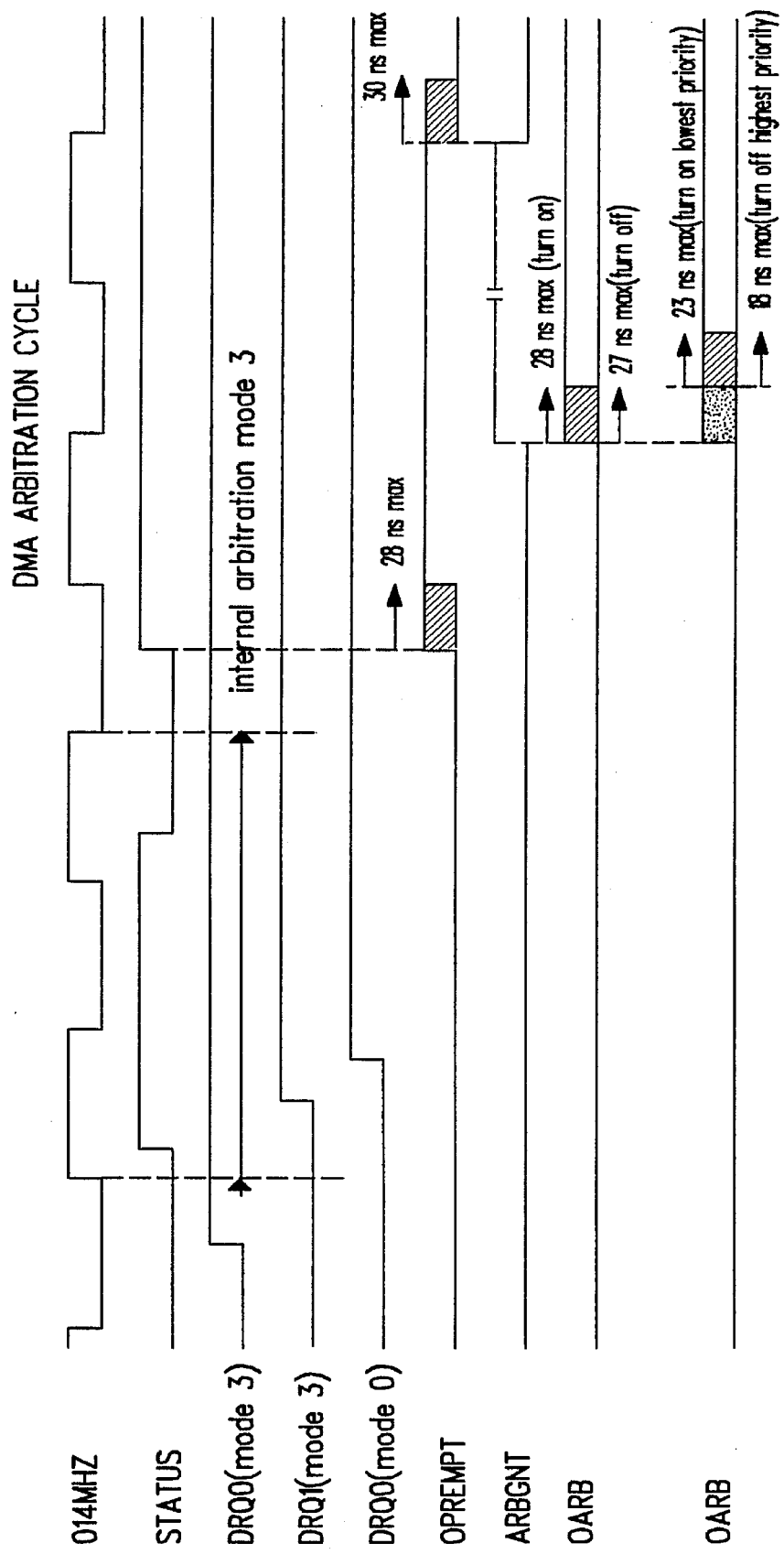
FIG. 15 shows the signals received or exchanged during a direct memory access arbitration cycle.
Figure 18:
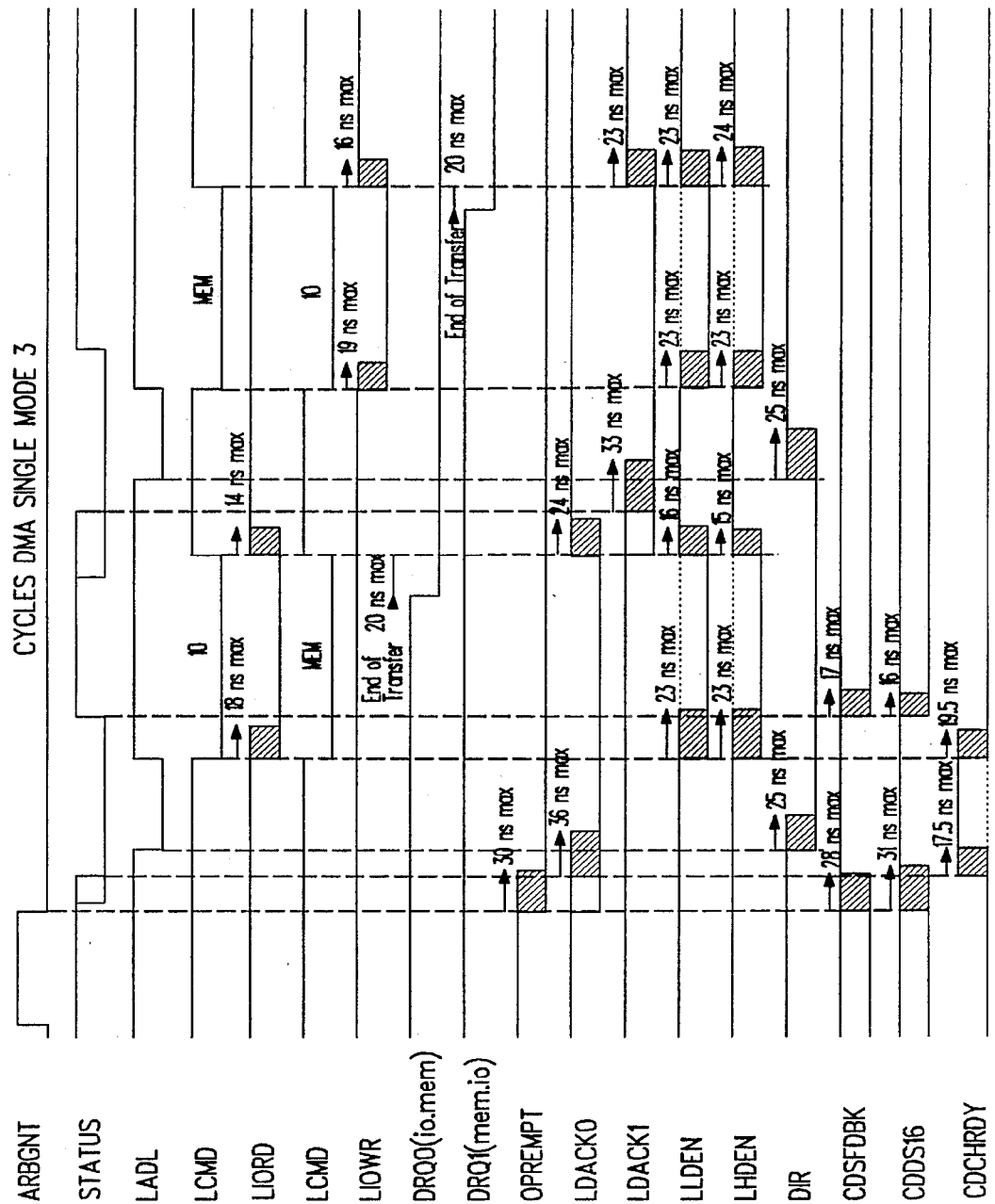
FIG. 18 shows the sequence of signals necessary for a single direct memory access cycle according to mode 3.

When used on a card of the type shown in FIG. 12, the circuit operates, when set up, in the sequence shown in FIG. 14 and, for a memory access cycle, after executing a DMA arbitration cycle with the MCA bus corresponding to FIG. 15, it executes a DMA exchange in the single mode according to the cycle shown in FIG. 18.

Finally, when used in a card of the type shown in FIG. 11, the circuit operates in the DMA Burst mode in the sequence shown in FIG. 19.

Figure 13:
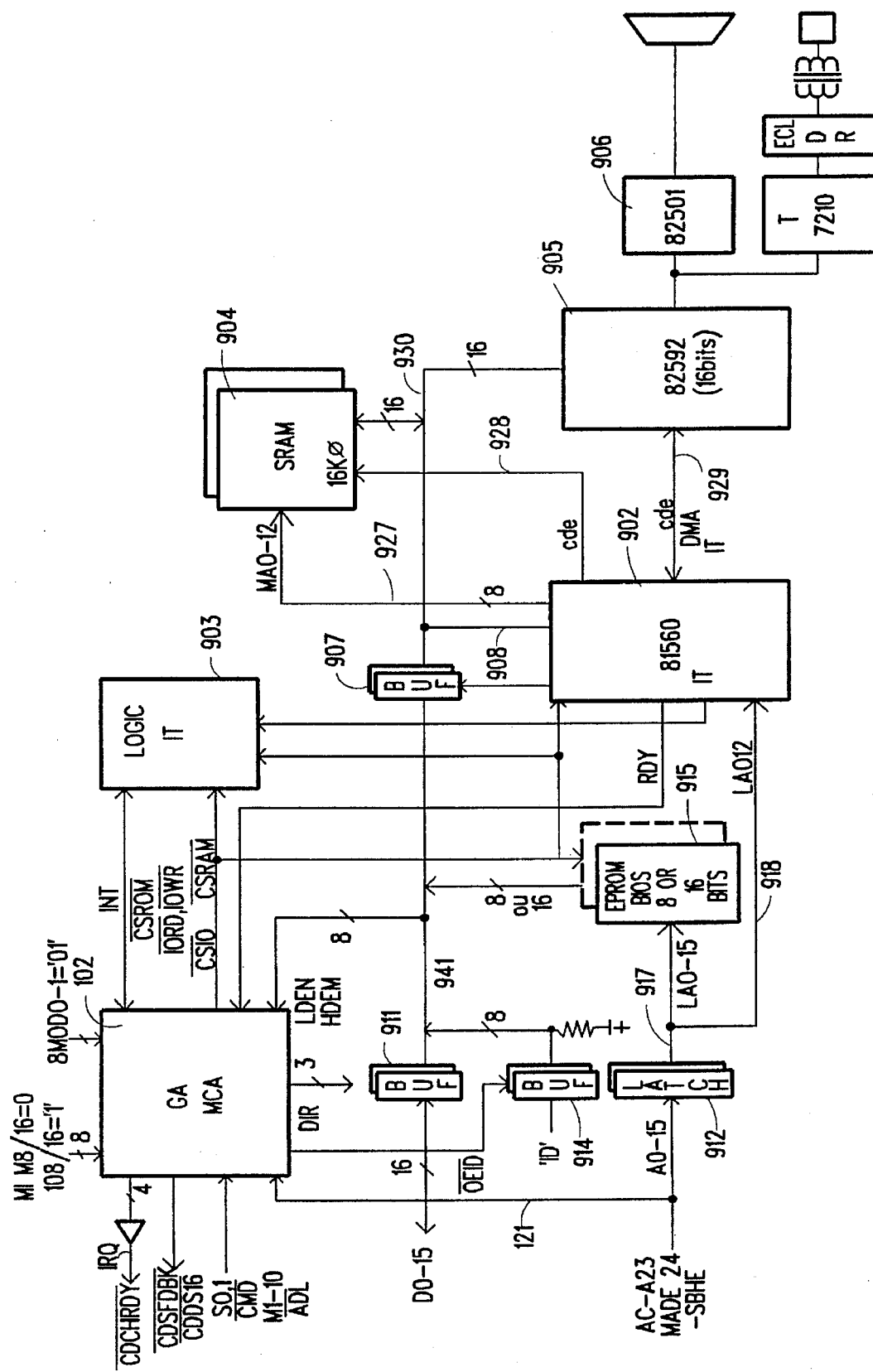
FIG. 13 shows one application example of the circuit in a LAN card.

FIG. 13 represents another utilization of arbitration circuit (102) wherein the signals (DIR, LDEN, HDEN) command buffer registers (911) of the 16 bit data bus and convert it into an 8 bit bus (941). Likewise, signal (LOEID) commands registers (914) containing the card identifier element transmitted over 8 bits to bus (941). Finally, signal (LADL) commands locked registers (912) which convert the 24 bit address bus into a 16 bit address bus (917). This address bus is sent to an EPROM (915) containing the local BIOS. This EPROM is connected by an 8 bit bus or 16 bit bus to bus (941). Address bus (917) sends its first 13 lines to an "Intel 82 560" memory management circuit. This circuit (902) receives signals (LCSROM, LIORD, LIOWR, LCSIO, LCSRAM), which signals are also sent to the EPROM and an interrupt logic (903). This interrupt logic exchanges signal (INT) with circuit (102).

Circuit (902) transmits signal (RDY) to arbiter (102). This circuit (902) commands a buffer (907) which allows bus (941), which has 8 data lines, to be converted into a 16 line bus (930). This circuit (902) furnishes a 12 bit address bus (927) to a set of static random access memories (904) connected to the 16 bit data bus (930). Likewise, this circuit (902) sends the command signals (928) necessary for commanding the static random access memory. Finally, this circuit (902) exchanges the DMA command signals and interrupt signals via a bus (929) with an interface management circuit 82,592 (905), which itself is connected at the output to a physical interface circuit 82,501 (906).

Figure 16:
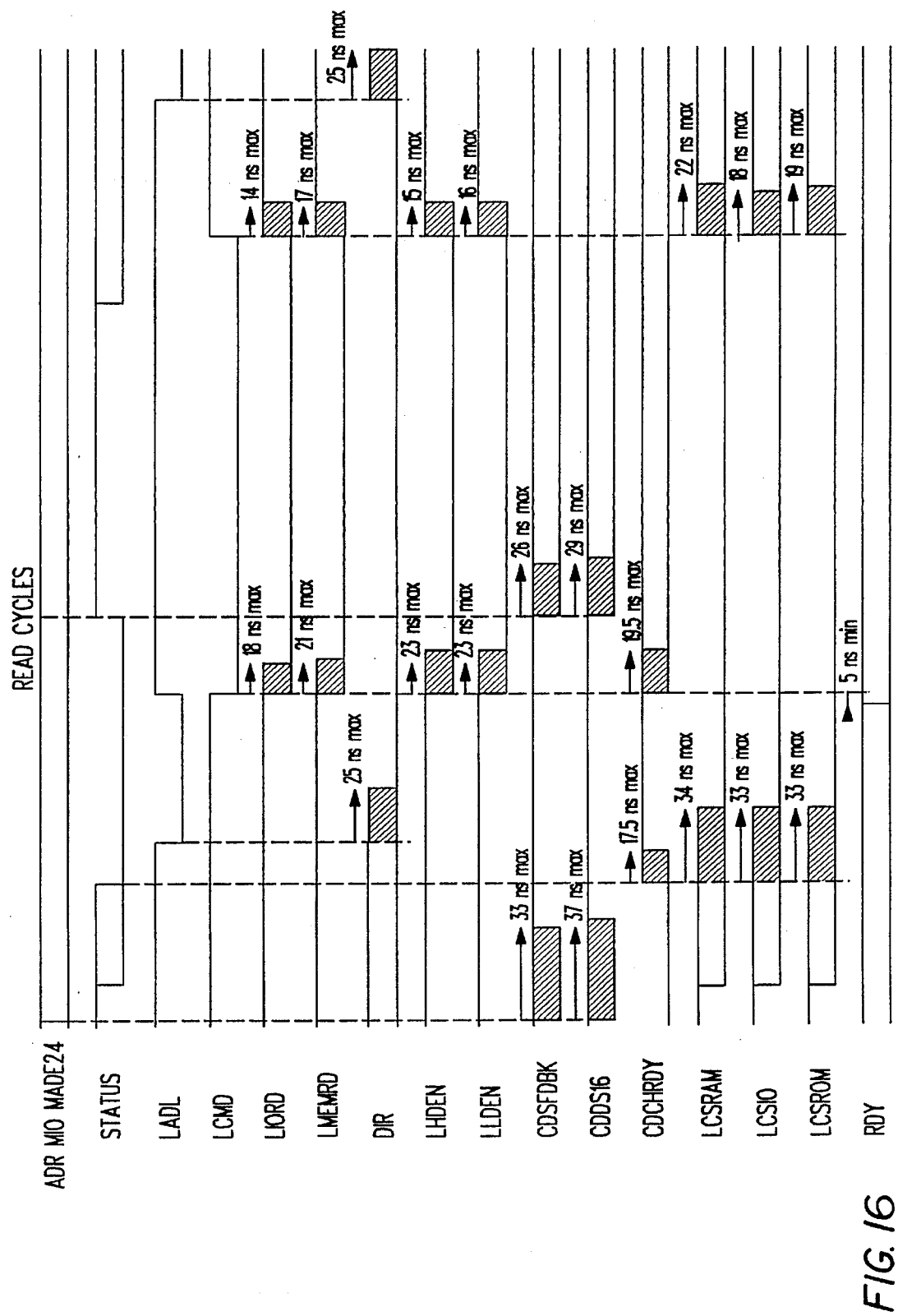
FIG. 16 shows the sequence of signals necessary for a read cycle.
Figure 17:
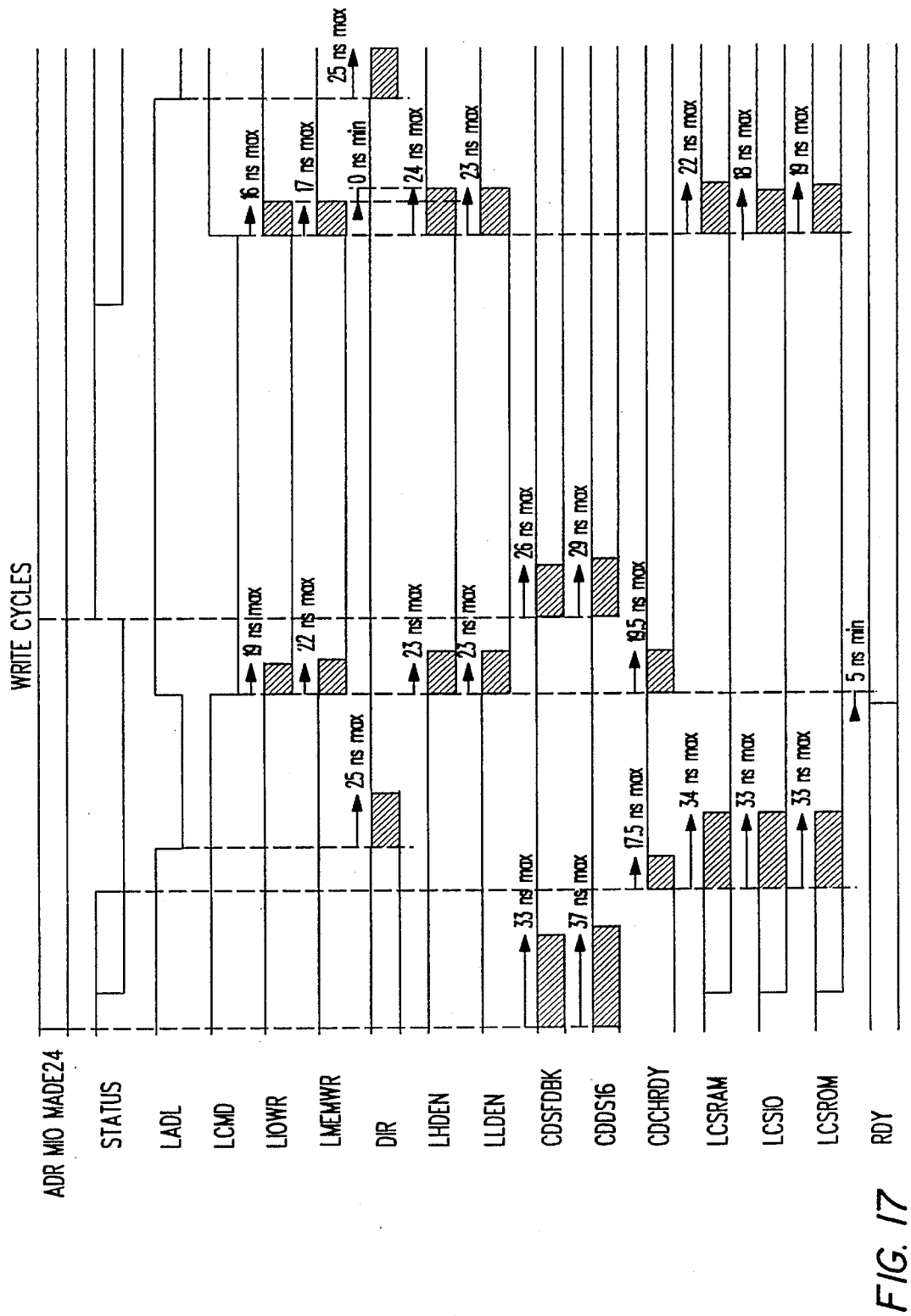
FIG. 17 shows the sequence of signals necessary for a write cycle.

When used on a card of the type shown in FIGS. 12 or 13, the circuit operates when started in the cycle of sequences shown in FIG. 14 and, for a read cycle or a memory write cycle in the sequences shown in FIGS. 16 and 17, respectively.

Other modifications within the reach of the individual skilled in the art are also part of the spirit of the invention.

What is claimed is:

1. A bus arbiter circuit comprising:

a bus arbitration logic circuit;

a command logic circuit coupled to said bus arbitration logic circuit;

a decode circuit having a plurality of programmable option select registers, said decode circuit coupled to said bus arbitration circuit and to said command logic circuit; and an operating mode decode logic circuit coupled to said bus arbitration logic circuit, said operating mode decode logic circuit decoding a received signal to determine which one out of a plurality of operating modes the bus arbiter circuit is to operate in and to command, as a function of the operating mode selected, operation of said bus arbitration logic circuit, said command logic circuit and said decode circuit; and to interpret the contents of said plurality of programmable option select registers.

2. The bus arbiter circuit of claim 1, wherein two of said plurality of programmable option select registers assign a predetermined value to an input-output field address of a coupler in a first predetermined set of modes and assign a second predetermined value to the input-output field of the coupler in a second predetermined mode.

3. The bus arbiter circuit according to claim 2, wherein in response to the bus arbiter circuit operating in a mode two, one of said plurality of programmable option select registers defines:

(a) a size of a memory window; and (b) an address of a memory field.

4. The bus arbiter circuit according to claim 2, wherein in response to the bus arbiter circuit operating in a mode one, one of said plurality of programmable option select registers designated to define a size of a random access memory window defines:

(a) a random access memory segment number in a window mode; and (b) a selection of one interrupt out of four interrupts.

5. The bus arbiter circuit according to claim 2, wherein in response to the bus arbiter circuit operating in a mode three, one of said plurality of programmable option select registers defines:

(a) a first priority level of a direct memory access mode; and (b) a second priority level of a direct memory access (DMA) mode.

6. The bus arbiter circuit according to claim 1 wherein:

(a) in response to the bus arbiter circuit operating in a first one of a mode 0, a mode 1 and a mode 3, one of said plurality of programmable option select registers defines a size of an extension segment of an input-output system, and a read only memory segment number of the input-output system;

(b) one of said plurality of programmable option select registers defines a size of an input-output field of a coupler;

(c) in response to the bus arbiter circuit operating in a mode two, one of said plurality of programmable option select registers selects one interrupt out of four interrupts;

(d) one of said plurality of programmable option select registers defines a segment number of a read only memory;

(e) one of said plurality of programmable option select registers defines a random access memory enable signal;

(f) one of said plurality of programmable option select registers defines an input-output enable signal;

(g) one of said plurality of programmable option select registers defines a card enable signal.

7. The bus arbiter circuit according to claim 1, wherein in response to the bus arbiter circuit operating in a mode zero, one of said plurality of programmable option select registers defines:

(a) a burst size of a direct memory access mode;

(b) a local arbitration enable signal;

(c) a fairness mode activation signal; and (d) a priority level of a direct memory access mode.

8. The bus arbiter circuit according to claim 1, wherein in response to the bus arbiter circuit operating in a mode zero and a mode three, the bus arbitration logic circuit provides:

(a) a signal LPREEMPT requesting setup of a bus channel by an arbitration procedure;

(b) a signal ARBGNT indicating that an arbitration procedure is under way;

(c) a signal DRQ0 indicating a DMA channel request presented by the bus arbiter circuit to the bus;

(d) a plurality of signals defining bus arbitration priority levels; and (e) a signal DACK0 indicating to a MCA bus coupled to the bus arbiter that a direct memory access cycle follows a request made by the signal DRQ0.

9. The bus arbiter circuit according to claim 1, wherein said decode circuit corresponds to a programmable option selection register decode circuit and in response to the bus arbiter circuit operating in a mode zero and a mode three, said programmable option selection register decode circuit provides a signal enabling a card on which said programmable option selection register decode circuit is located, and a programmable option selection register selection signal.

10. The bus arbiter circuit according to claim 1 wherein in response to the bus arbiter circuit operating in a mode one or a mode two, the arbitration logic circuit provides:

an interrupt level determination signal;

a memory read command signal;

a memory write command signal; and a random access memory RAM select signal.

11. The bus arbiter circuit according to claim 1, wherein in response to the arbiter circuit operating in a mode one or a mode three, said programmable option selection register decode circuit provides a pair of signals OEID0 and OEID1 that enable a register containing an identifier of a card on which said programmable option selection register decode circuit is located.

12. The bus arbiter circuit according to claim 1, in response to the bus arbiter circuit operating in mode two, said arbitration logic provides:

a CHCK signal indicating appearance of a serious error at an output;

an ICHCK signal indicating appearance of a serious error at an input;

an INT signal indicating the appearance of an interrupt signal;

an WS (0-1) signal indicating a size of a random access memory used in combination with the arbitration circuit on a card; and a STAT signal indicating the presence of an error status.

13. The bus arbiter circuit according to claim 1, wherein in response to said bus arbiter circuit operating in a mode zero, said arbitration logic circuit provides a plurality of BURST DMA exchange interrupt signals.

14. The bus arbiter circuit according to claim 1, wherein in response to said bus arbiter circuit operating in a mode three, said arbitration logic circuit provides:

a DRQ1 signal indicating a DMA channel request to an MCA bus; and a DACK1 signal indicating to the MCA bus coupled to the bus arbiter circuit that a direct memory access cycle follows a request made by the DRQ1 signal.

15. The bus arbiter circuit according to claim 1 wherein the bus arbiter circuit is operated in a first one of four operating modes, said first one of four operating modes corresponding to a mode three in a LAN card having an interface circuit (802) coupled to said arbitration circuit (102) to receive control signals by:

a fifteen line address bus via first buffer registers (812) commanded by a LADL signal of said arbitration circuit on a 24 line bus;

an eight bit data bus via a second buffer register (811) commanded by signals DIR and LDEN to an 8 bit data bus of an MCA bus; and an EPROM memory selected by a LCSROM signal.

16. The bus arbiter circuit according to claim 1 wherein the bus arbiter circuit is operated in a first one of four operating modes, said first one of the four operating modes corresponding to a mode one in a minimum LAN card, said minimum LAN card comprising a circuit (802) coupled to the arbitration circuit (102) to receive control signals therefrom by:

a fifteen line address bus via first buffer registers (812) commanded by a LADL signal of the arbitration circuit on a 24 line bus;

an 8 bit data bus via a second buffer register (811) commanded by signals DIR and LDEN to an 8 bit data bus of an MCA bus; and an EPROM memory selected by a LSROM signal.

17. A microchannel bus arbiter circuit (102) having a bus arbitration logic circuit (104), a command logic circuit (105) and a decode circuit (106), said decode circuit having a plurality of programmable option selection registers (POS), the microchannel bus arbiter circuit (102) comprising:

an operating mode decode logic circuit (108) for decoding signals received on an input terminal of the bus arbiter circuit (102) to determine one out of four operating modes;

a ready signal circuit (107) coupled to the bus arbitration logic circuit (104), the command logic circuit (105) and the decode circuit (106); and a communication bus (109) coupled to said operating mode decode logic circuit (108), the bus arbitration logic circuit (104), the command logic circuit (105), and the decode circuit (106) for providing to the decode circuit (106), command logic circuit (105) and arbitration circuit (104), a plurality of mode signals to the decode circuit (106), the command circuit, (105) arbitration circuit (104) and the ready signal circuit (107) wherein the ready circuit delivers a ready signal to select as a function of a selected mode information from the programmable option selection registers useful for providing output signals on each said arbitration, command, decode and ready signal circuits (104, 105, 106, 107) corresponding to the operating mode selected and programming of the plurality of the programmable option selection registers.

18. A microchannel bus arbiter integrated circuit having a bus arbitration logic circuit, a command logic circuit, a decode circuit and a plurality of POS registers, the improvement comprising:

a logic circuit decoding signals received on an input signal path of the microchannel bus arbiter integrated circuit to determine one out of four operating modes of the microchannel bus arbiter integrated circuit;

a ready signal circuit (107) coupled to the bus arbitration logic circuit (104), the command logic circuit (105) and the decode circuit (106) for delivering a ready signal; and a communication bus (109) coupled to the decode circuit (106), command logic circuit (105) and arbitration circuit (104), said communication bus for furnishing MODE signals to each of the decode circuit (106), command logic circuit (105) and arbitration circuit (104), wherein the ready signal circuit (107) delivers a ready signal to select as a function of MODE selected information from the POS registers useful for producing output signals on each of the arbitration, command, decode and ready signal circuits (104, 105, 106, 107) corresponding to the operating MODE selected for the bus arbiter circuit and programming of the POS registers.

* * * * *

UNITED STATES PATENT AND TRADEMARK OFFICE
CERTIFICATE OF CORRECTION

PATENT NO. : 5,506,970
DATED : April 9, 1996
INVENTOR(S) : Yannick Wozniak

It is certified that error appears in the above-identified patent and that said Letters Patent is hereby corrected as shown below:

Column 6, line 55, "0=memory disable =16 kB memory enabled" should read --0=memory disable
        1=16 kB memory enabled--.

Column 13, line 18, "DNA request" should read --DMA request--.

Column 25, line 40, "a MCA bus" should read --an MCA bus--.

Signed and Sealed this

Twenty-ninth Day of September, 1998

Attest:

BRUCE LEHMAN

*Attesting Officer*     *Commissioner of Patents and Trademarks*